(12) United States Patent
Laurence et al.

(10) Patent No.: US 9,045,183 B2
(45) Date of Patent: Jun. 2, 2015

(54) FLEXIBLE CONVEYANCE SYSTEM

(71) Applicant: KUKA Systems Corporation North America, Sterling Heights, MI (US)

(72) Inventors: Kevin J. Laurence, Rochester, MI (US); Michael P. LaRose, Rochester Hills, MI (US)

(73) Assignee: KUKA Systems Corporation North America, Sterling Heights, MI (US)

( * ) Notice: Subject to any disclaimer, the term of this patent is extended or adjusted under 35 U.S.C. 154(b) by 0 days.

(21) Appl. No.: 14/211,793

(22) Filed: Mar. 14, 2014

(65) Prior Publication Data

US 2014/0262681 A1 Sep. 18, 2014

Related U.S. Application Data

(63) Continuation-in-part of application No. 14/211,572, filed on Mar. 14, 2014.

(60) Provisional application No. 61/781,147, filed on Mar. 14, 2013.

(51) Int. Cl.
*B65G 17/00* (2006.01)
*B62D 65/18* (2006.01)
*B62D 65/02* (2006.01)

(52) U.S. Cl.
CPC .............. *B62D 65/18* (2013.01); *B62D 65/024* (2013.01)

(58) Field of Classification Search
USPC ............. 198/343.1, 346.1, 346.2, 346.3, 617; 104/281, 283, 290; 414/928, 929
See application file for complete search history.

(56) References Cited

U.S. PATENT DOCUMENTS

| | | | | |
|---|---|---|---|---|
| 3,575,301 | A | * | 4/1971 | Panissidi ........................ 414/618 |
| 4,492,297 | A | * | 1/1985 | Sticht .......................... 198/345.3 |
| 4,615,274 | A | | 10/1986 | Hoehn |
| 4,788,786 | A | | 12/1988 | Suter |
| 4,792,036 | A | | 12/1988 | Heidelberg |
| 4,881,633 | A | * | 11/1989 | Cailey et al. ................ 198/345.1 |
| 4,966,080 | A | * | 10/1990 | Teissier et al. ................. 104/289 |
| 5,125,140 | A | * | 6/1992 | Sticht .............................. 29/33 P |
| 5,152,050 | A | | 10/1992 | Kaczmarek et al. |
| 5,579,695 | A | | 12/1996 | Cockayne |
| 5,839,567 | A | * | 11/1998 | Kyotani et al. ................ 198/683 |
| 5,957,057 | A | * | 9/1999 | Nakamura et al. ............ 104/111 |
| 6,101,952 | A | * | 8/2000 | Thornton et al. ............. 104/282 |
| 6,234,737 | B1 | * | 5/2001 | Young et al. ................... 414/277 |
| 6,308,821 | B1 | * | 10/2001 | Asai et al. ................... 198/750.7 |
| 6,318,542 | B1 | * | 11/2001 | Ikeda et al. .................... 198/769 |

(Continued)

OTHER PUBLICATIONS

U.S. Patent and Trademark Office; Search Report and Written Opinion in International Patent Application No. PCT/US2014/028819 dated Jul. 28, 2014; 12 pages.

*Primary Examiner* — Douglas Hess
(74) *Attorney, Agent, or Firm* — Wood, Herron & Evans, LLP

(57) ABSTRACT

A conveyance system includes a plurality of feed-forward track segments aligned end-to end, each having an upwardly facing channel and at least one linear motor disposed in the channel. At least one carrier is supported for movement along the track segments. Each carrier includes at least one magnet that cooperates with the linear motors to move the carrier along the respective feed-forward track segments. The conveyance system may further include a plurality of return track segments spaced from the plurality of feed-forward track segments.

11 Claims, 24 Drawing Sheets

(56) References Cited

U.S. PATENT DOCUMENTS

| | | | |
|---|---|---|---|
| 6,662,934 B1 * | 12/2003 | Iida | 198/750.1 |
| 6,834,595 B1 * | 12/2004 | Henderson | 104/88.01 |
| 6,938,752 B2 | 9/2005 | Stewart et al. | |
| 6,962,249 B2 * | 11/2005 | Ludwig et al. | 198/345.3 |
| 7,070,041 B1 * | 7/2006 | Dirschbacher et al. | 198/750.1 |
| 7,458,454 B2 * | 12/2008 | Mendenhall | 198/463.2 |
| 7,614,790 B2 * | 11/2009 | Liu et al. | 384/13 |
| 7,731,015 B2 * | 6/2010 | Abe et al. | 198/620 |
| 8,011,491 B2 * | 9/2011 | Nakagawa et al. | 198/346.2 |
| 8,191,481 B2 | 6/2012 | Spangler et al. | |
| 8,616,134 B2 * | 12/2013 | King et al. | 104/284 |

* cited by examiner

FLEXIBLE CONVEYANCE SYSTEM

CROSS-REFERENCE

This application claims the benefit of priority to U.S. Provisional Patent Application Ser. No. 61/781,147 filed Mar. 14, 2013, and is a continuation-in-part of U.S. patent application Ser. No. 14/211,572 filed Mar. 14, 2014, the disclosures of which are incorporated by reference herein in their entirety.

TECHNICAL FIELD

The invention relates generally to material handling systems and, more particularly, to conveyance systems for assembly-line fabrication.

BACKGROUND

Material handling systems for assembly-line fabrication are generally designed to facilitate efficient and rapid fabrication of an assembly from a plurality of parts or sub-assemblies. One area particularly suited to such material handling systems is automotive manufacturing. For example, material handling systems may be used for the assembly of a vehicle's sheet metal body, power train, chassis sub-assemblies, or trim. Material handling systems may also be used in painting operations, welding, bonding, or other general assembly operations.

Generally a carrier, a structure for accumulating the various parts and sub-assemblies that will eventually be joined to a vehicle body, travels through a plurality of stations. At each station, components may be added and/or joining operations may be performed (e.g., resistance welding, adhesive bonding, stud welding, etc.) by a plurality of robots or tradesman. Individual components or sub-assemblies may be provided to the various stations by a magazine, which presents the parts to the robots or tradesmen in a consistent orientation and at sufficient frequency to match the pace of an assembly line. Either at discrete stations, or in conjunction with other tasks, a plurality of geometric orientation tools ("geo-tools") may be used to manipulate the parts into precise alignment with various reference points prior to being permanently joined.

Often, the carrier may be conveyed by a generic transfer frame. The transfer frame may be moved from station to station by a variety of different transfer systems, such as an overhead track system, for example, and may be raised and lowered with respect to the stations.

There are several disadvantages traditional conveyance systems. For example, the transfer frame and carriers produce a bulky combined assembly. At the end of the assembly line, each of the transfer frames and carrier assemblies must be returned to the beginning of the line. This often involves dedicating a return loop, typically located above the assembly line, for the purpose of returning the empty carriers and frames. Unfortunately, this return loop generally bisects an upper catwalk and, therefore, prohibits maintenance personnel on one side from being able to safely pass to the other side of the catwalk. This greatly hinders troubleshooting and access to equipment cabinets and overhand routed utilities.

Additionally, each of the frames and carriers may be communally tied to an overhead conveyer. Accordingly, carriers and frames at one station cannot be moved independently with respect to carriers and frames at other stations. This results in a lack of flexibility, and carriers are unable to rapidly pass through unnecessary stations. Moreover, carriers must be moved through the various stations at a constant movement and delay pattern. A carrier and corresponding parts undergoing processing at one station, even when processing is completed, cannot move until all of the other stations have completed their respective tasks. Limit switches, slow switches, and stop switches control the overhead conveyer as one collective unit.

Therefore, an improved non-overhead conveyance system with improved flexibility is needed.

SUMMARY

The present invention overcomes the foregoing and other shortcomings and drawbacks of conventional conveyance systems heretofore known for use in transferring components along an assembly line. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present invention, a flexible conveyance system includes a plurality of feed-forward track segments and at least one carrier supported for movement along the feed-forward track segments. Each feed-forward track segment has an upwardly facing channel and at least one linear motor disposed within the channel. Each carrier includes at least one magnet that cooperates with the linear motors of the feed-forward track segments to move the carrier along the respective track segments. Support structure associated with each carrier supports assembly components above a mounting rail of the carrier.

An another aspect, the flexible conveyance system may further include a plurality of return track segments aligned end-to-end and spaced from the plurality of feed-forward track segments. Each return track segment has a downwardly-facing channel extending lengthwise along the return track segment, and at least one linear motor disposed within the channel. The linear motors of the return track segments cooperate with the magnet, or magnets, on the carriers to move the carriers along the return track segments.

The above and other objects and advantages in accordance with the principles of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention. Similar reference numerals are used to indicate similar features throughout the various figures of the drawings.

DETAILED DESCRIPTION

Figure 1:
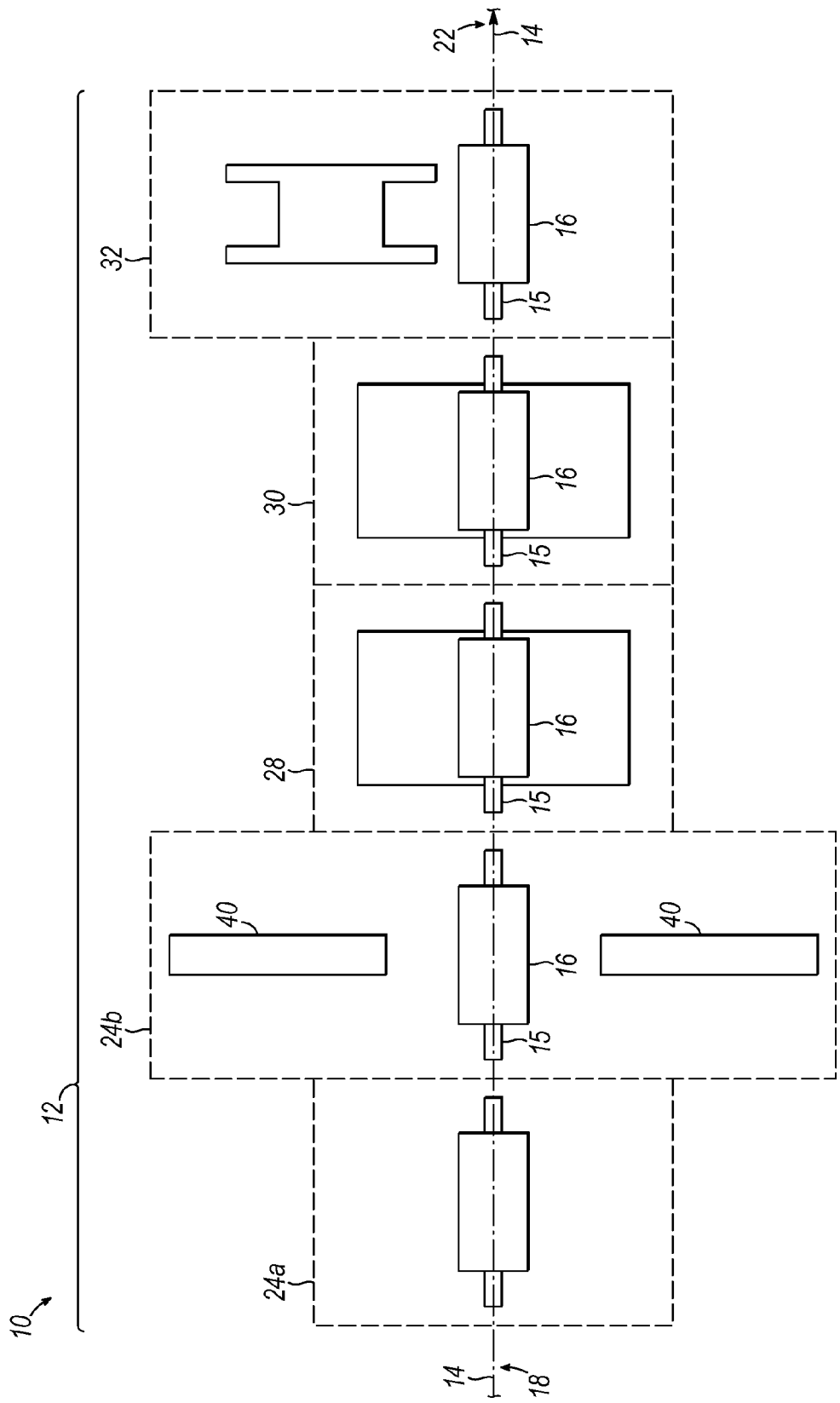
FIG. 1 is a schematic plan view of an assembly line including an exemplary conveyance system in accordance with the principles of the present invention.

FIG. 1 is a schematic illustration of an exemplary, flexible inverted conveyance system 10 in accordance with the principles of the present invention. A plurality of stations 12 are configured to process and assemble various components and sub-components, such as automotive bodies.

The system 10 includes a track 14 that conveys parts between the various stations 12. A carrier 16 (described in more detail below with respect to FIGS. 5 and 9) cooperates with the track 14 and serves as a foundation to receive various parts and subcomponents. The carrier 16 is introduced at the beginning of the line 18, and is conveyed by a plurality of belt segments 20 (described in more detail below with respect to FIGS. 6-8) that are disposed beneath the track 14. It has been observed that several configurations of belt 20 may provide acceptable results. Two important design characteristics of belt 20 include resistance to elongation and the application of sufficient frictional forces between the belt segment 20 and the carrier 16. For example, one embodiment of the invention may use a steel reinforced nylon belt to resist elongation while the belt segment 20 is under load while conveying the carrier 16. Additionally, certain embodiments may utilize a grooved belt to enhance frictional forces between the belt segment 20 and the carrier 16, while other embodiments my use a molded urethane coating or other resilient compound. In the exemplary system 10, the belt segments 20 may be completely enclosed by the track segments 15. It should be noted that while the track 14 is illustrated in the drawings as being continuous, the track actually comprises a plurality of segments, wherein each segment is independent of the adjacent segments. The carrier 16 is driven by the various belt segments 20 toward the end of the line 22.

With continued reference to FIG. 1, one possible configuration of the various stations 12 that the carrier 16 passes through on the track segments 15 and belt segments 20 will be described. After being mated with the track segment 15, the carrier 16 first enters a component placement station 24, which may include a first placement station 24a and a second placement station 24b. A plurality of feed conveyors 40 hold, orient, and advance various auto body components and sub-assemblies that are positioned near the track segment 15. Various robots (described in more detail below) may grasp parts from the feed conveyor 40 and place them onto the carrier 16. The carrier 16 then progresses to the next station 12, a geo-tool 28, where the various components on the carrier 16 are aligned with each other and preliminarily joined together. The carrier 16 may then progresses to the next station 12, which is a re-spot tool 30. The re-spot tool 30 may apply additional welds that could not be applied at geo-tool station 28 due to obstructions in the geo-tool 28, or because of time constraints. The carrier 16 may then travel through a plurality of additional stations 12 that could include adhesive bonding, additional geo-tools 28, additional component placement stations 24, or additional re-spot tools 30.

When the carrier 16 enters the geo-tool 28, the track segment 15 and belt segment 20 are lowered to the ground. This effectively transfers the weight of the parts or sub-components onto the geo-tool 28 itself, and off of the carrier 16. Once the load of parts is no longer on the carrier 16, the geo-tool 28 and its various fixtures can manipulate the sub-assembly and place each of the components into a particular geometric relationship with each other. While the carrier 16 is lowered out of the way, the robots are able to more easily access various surfaces of the auto body in the absence of interfering projections of the carrier 16. As the track segment 15 is lowered, the belt segment 20 is placed into a free-wheeling configuration, and an internal clutch decouples the belt segment 20 from a drive. The carrier 16 is then able to move fore and aft, thereby allowing the parts to be engaged by the geo-tool 28.

After completing each of the various processing stations 12, the carrier 16 terminates at the end of line 22 at an off-load station 32. At the off-load station 32, the completed auto body sub-assembly is removed from the carrier 16. The carrier 16 is decoupled from the track 14 and a robot transfers the carrier 16 from the track 14 to an overhead return track 34 (described in more detail blow with respect to FIG. 14) that conveys the carrier 16 back to the beginning of the line 18.

Figure 2:
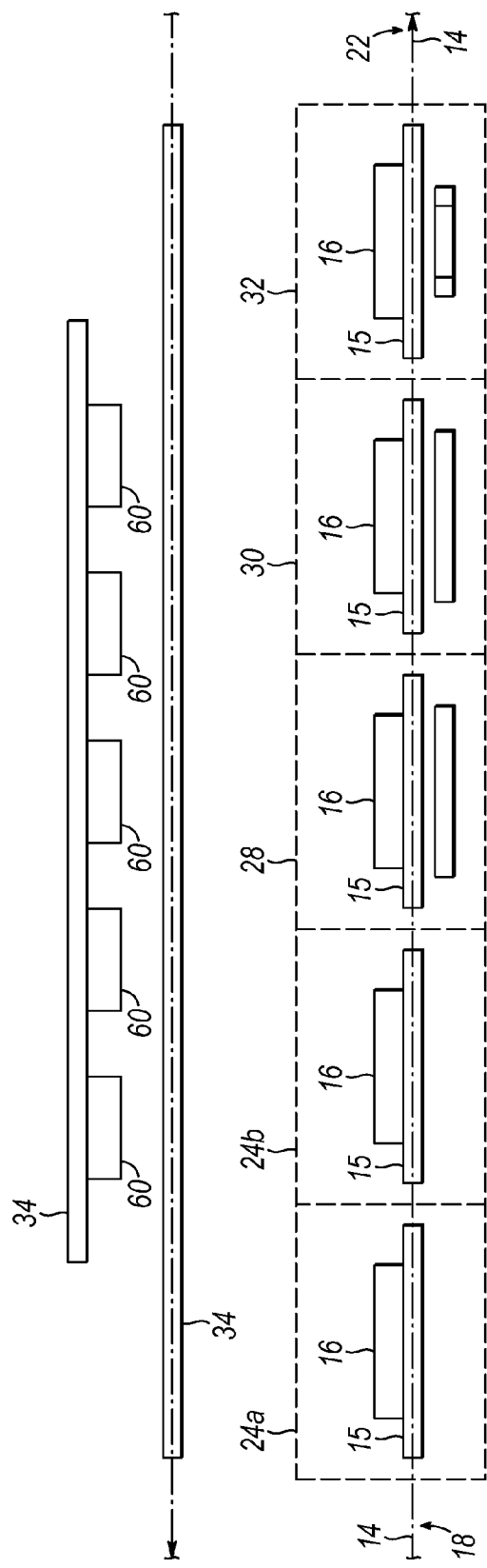
FIG. 2 is a schematic elevation view of the exemplary conveyance system of FIG. 1.

FIG. 2 is a side elevation view of the exemplary conveyance system 10 of FIG. 1, including an overhead return track 34 disposed between the track 14 and a catwalk 36. The catwalk 36 may support equipment 60, such as motor controllers, robot control cabinets, utility distribution systems, etc., and facilitates maintenance, repair, and troubleshooting thereof. It should be noted that this configuration of track 14, return track 34, and catwalk 36 allows for an unobstructed path for service personnel on the catwalk 36. By way of counter-example, if the overhead return track 34 was situated above the catwalk 36, service personnel would be unable to walk from one side of the catwalk 36 to the other side of the catwalk 36. The path would be obstructed by the overhead return track 34 and carriers 16 that are recycled back to the beginning of the line 18. In this view, the geo-tool 28 and re-spot tool 30 are depicted as having track segments 15 configured to raise and lower independently from the other track sections 15 and independently from other stations 12. It should also be noted that the stations 12 and their corresponding belt segments 20 are capable of independent linear speed control with respect to adjacent belt segments 20. This enables the carrier 16 to be advanced down the track 14 thereby bypassing unused stations 12. Additionally, this allows the carrier 16 to be released from a station 12 and placed into a vacant station 12, even prior to adjacent carrier 16 being released from an adjacent station 12.

Figure 3:
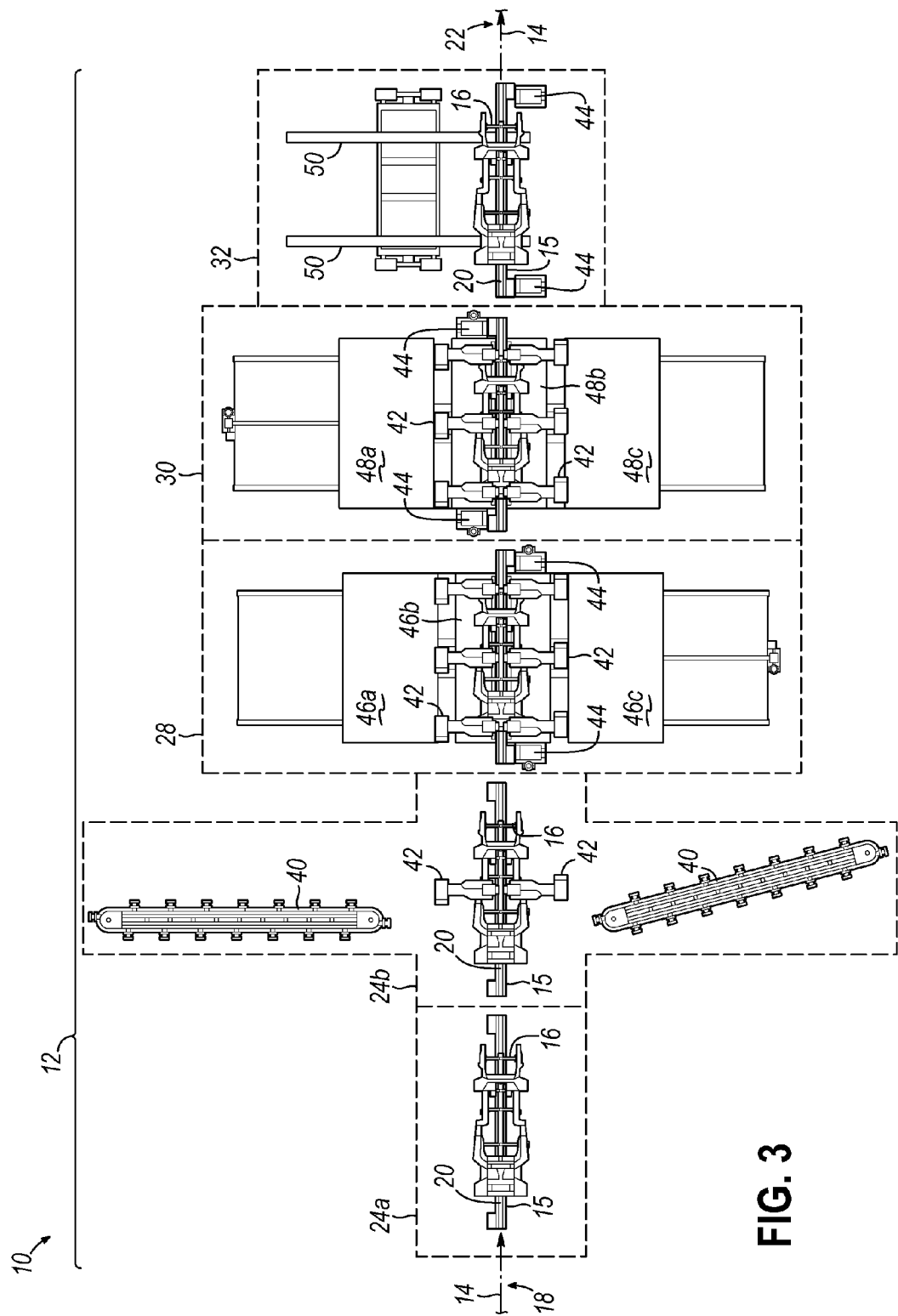
FIG. 3 is a more detailed top plan view of the conveyance system of FIG. 1.

Referring now to FIG. 3, a plan view of the conveyance system 10 of FIG. 1 is illustrated in greater detail, however, catwalk 36 and overhead return track 34 have been omitted for clarity. Starting at the beginning of the line 18, a carrier 16 sits at a component placement station 24a and has been loaded with several large sub-assemblies of an automotive body. The track segment 15 and corresponding belt segment 20 of station 24a are configured to be static. For the purposes of this discussion, a static track segment 15 is defined as one that is incapable of raising and lowering with respect to the assembly line floor. At component placement station 24b, the carrier 16 receives additional auto body components from a plurality of feed conveyors 40. Some embodiments may utilize feed conveyors 40 of a horizontal configuration, while other embodiments may utilize vertical conveyors to minimize consumption of assembly line floor space. As with station 24a, the station at 24b is also configured to be static and is only capable of linear translation of the carrier 16. A plurality of robots 42 transfer auto body components from the feed conveyor 40 to the carrier 16 which is parked in the component placement station 24b. Parts from the feed conveyor 40 are advanced to the assembly line at a rate sufficient to supply the carrier 16 as it enters the component placement station 24b.

A geo-tool 28 is the first station 12 of the assembly line that is configured with a vertical translation tower 44. The vertical translation towers 44 are configured to move the track segment 15, and corresponding belt segment 20, up and down with respect to the assembly line floor. Since the vertical translation towers 44 and robots are a primary physical interface between the system 10 and the facility floor, it is desirable to conceal a majority of plant utilities therein. Therefore, robots 42 and vertical translation towers 44 may include channels or penetrations in their respective bases, so that electrical power conductors, electrical signal conductors, hydraulic lines, pneumatic lines, and the like may travel from the assembly line floor to the system 10 in a protected and efficient manner.

With continued reference to FIG. 3, a plurality of geo-tool trays 46a-46c may be positioned underneath the track segment 15 and disposed between a pair of vertical translation towers 44. Each of the geo-tool trays 46a-46c are configured with a plurality of indexing pins, holding fixtures, clamping means, and the like, that correspond to a particular automotive make and model and combination of auto body parts. Therefore, the conveyance system 10, in this particular example, is capable of accommodating at least three different variations of automotive body frame to be processed on the assembly line.

Once the carrier 16 is positioned over the appropriate geo-tool tray 46a-46c, an internal clutch mechanism disengages power from the belt segment 20. This essentially places the carrier 16 in a configuration allowing for fore and aft movement of carrier 16 with respect to the geo-tool tray 46a-46c. Therefore, when the track segment 15 is lowered into contact with the geo-tool tray 46a-46c by the vertical translation towers 44 the carrier 16 is capable of reciprocating freely to bring the parts into contact with the appropriate portions of the geo-tool tray 46a-46c. Once lowered, the carrier 16 no longer bears the weight of the automotive body components and the weight of said components is now in contact with the various components of the geo-tool tray 46a-46c. A plurality of robots 42 preliminarily secure each of the auto body components in a desired relationship with the other auto body components. Once the parts are preliminarily secured, the track segment 15 is raised by the vertical translation towers 44, bringing the automotive components back into contact with the carrier 16. When the track segment 15 is fully raised, the full weight of the automotive assembly is on the carrier 16, and the carrier 16 is ready for movement into the next station 12.

The next station 12 is a re-spot tool 30. The re-spot tool 30 is configured to perform additional joining operations that were infeasible due to obstructions in the prior station 12 or due to time limitations at the prior station 12. A plurality of re-spot tool trays 48a-48c may be positioned underneath the track segment 15 in the same way that the plurality of geo-tool trays 46a-46c were positioned in the geo-tool 28. Once the carrier 16 is positioned over the appropriate re-spot tool tray 48a-48c, a pair of vertical translation towers 44 lower the track segment 15 into contact with the re-spot tool tray 48a-48c. A plurality of robots 42 provide additional welding to the automotive components that are positioned and supported by the re-spot tool 30. After additional welding steps are complete, the pair of vertical translation towers 44 raise the track segment 15 and cooperating carrier 16 vertically with respect to the assembly line floor. The weight of the automotive body components are then transferred from the re-spot tool tray 48a-48c to the carrier 16. When the track segment 15 and cooperating carrier 16 are fully raised, the carrier 16 is ready to be advanced to the next station 12. It should be noted that these exemplary views depict a truncated version of a full assembly line. Any combination or number of individual stations 12 may be placed in sequential order to allow for flexibility in the manufacturing process. For example, additional operations may be performed at the various stations 12 to include adhesive bonding, stud or fastener placement, automated or mechanical adjustment of parts, automated or manual application of trim and other accessory components, etc.

The final exemplary station 12 illustrated in FIG. 3 is an offload station 32. Once the carrier 16 is in the offload station 32, a plurality of lifting forks 50 are reciprocated into a position between the carrier 16 and automotive body components. The vertical translation towers 44 lower the track segment 15 and carrier 16 a sufficient distance to transfer the weight of the automotive body components onto the lifting forks 50. The lifting forks 50 then retract to their original position away from the track 14 and place the partially assembled automotive body onto a cart or other conveyance for movement throughout the factory. As will be described in more detail below with reference to FIG. 14, a robot 42 transfers the carrier 16 from the track segment 15 to an overhead return track 34. The overhead return track 34 returns the carrier 16 from the end of the line 22 back to the beginning of the line 18. As will be explained in greater detail in the discussion that follows, the configuration of the overhead return track is such that an unobstructed path on the catwalk 36 is maintained.

Figure 4:
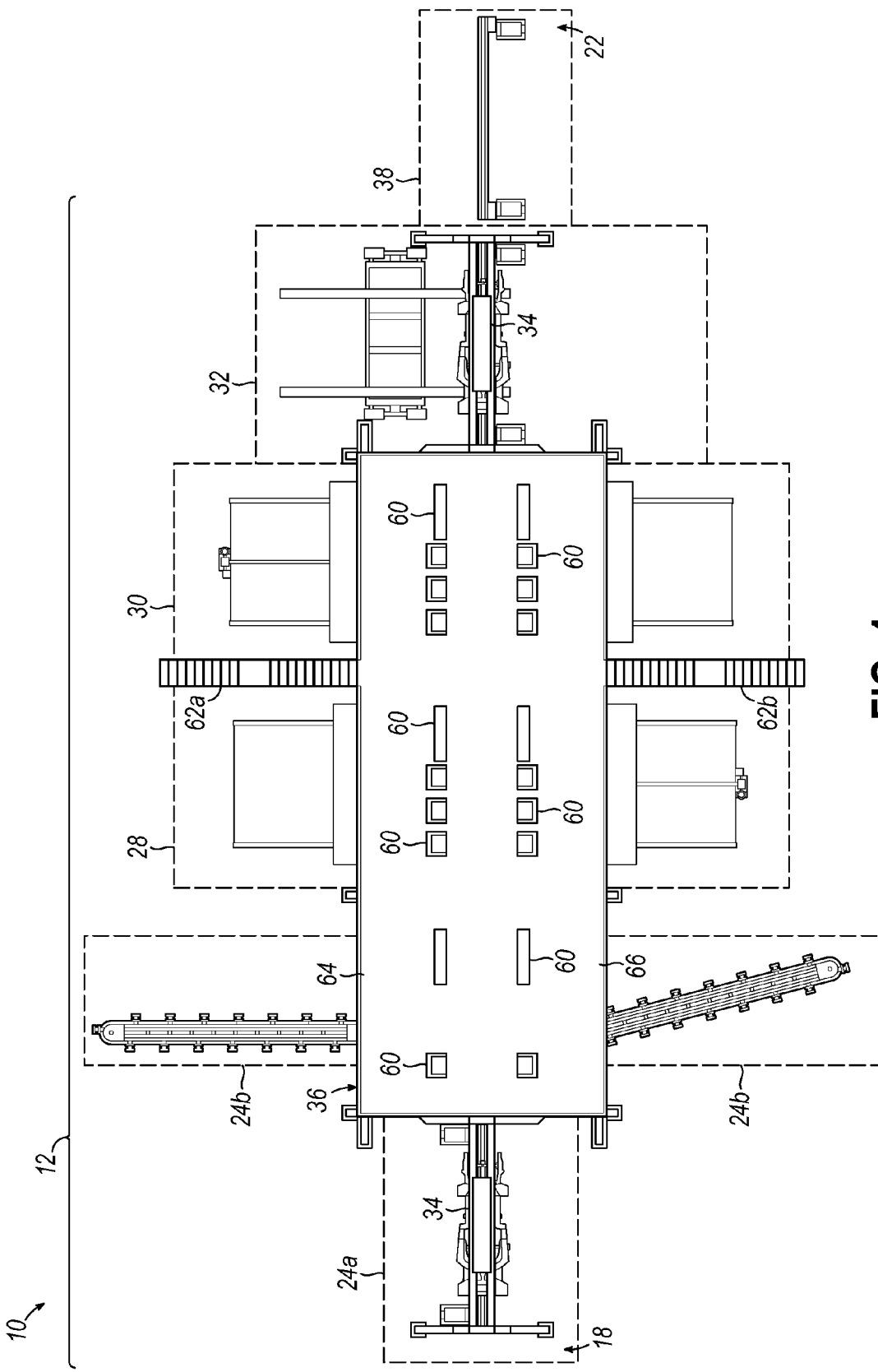
FIG. 4 is a top plan view of the conveyance system of FIG. 3, further including a catwalk and an overhead return track.

FIG. 4 is a plan view of the conveyance system 10, similar to FIG. 3, but now including the catwalk 36 and overhead return track 34. The catwalk 36 and corresponding equipment 60 are situated directly above the track 14. The overhead return track 34 is situated below the catwalk 36 in this top view. A plurality of stairs 62a and 62b join the ground level of the assembly line to the catwalk 36. In the absence of a carrier return track disposed above the catwalk 36, a worker may travel up the stairs 62a, across the catwalk 36, and down the stairs 62b on the opposite side of the catwalk 36. This configuration provides greatly improved efficiency during trouble-shooting and repair procedures. A technician on the catwalk 36 may freely move from the left side 64 to the right side 66 of the catwalk 36. The orientation of left side 64 and right side 66 is defined when one is standing at the beginning of the line 18 and looking toward the end of the line 22. Therefore, performance of the equipment 60 on the left side 64 of the catwalk 36 may be readily compared with equipment 60 performance on the right side 66 of the catwalk 36 during troubleshooting procedures.

FIG. 4 also illustrates an optional repair station 68 positioned at the end of the line 22. Damaged portions of the carrier 16 may be replaced, adjusted, or refurbished after being removed from the assembly line and placed onto a track segment 15 of the repair station 68. A partition (not shown) may be disposed between the offload station 32 and repair station 68, so that the carrier 16 may be safely serviced while the main assembly line continues to operate.

Figure 5:
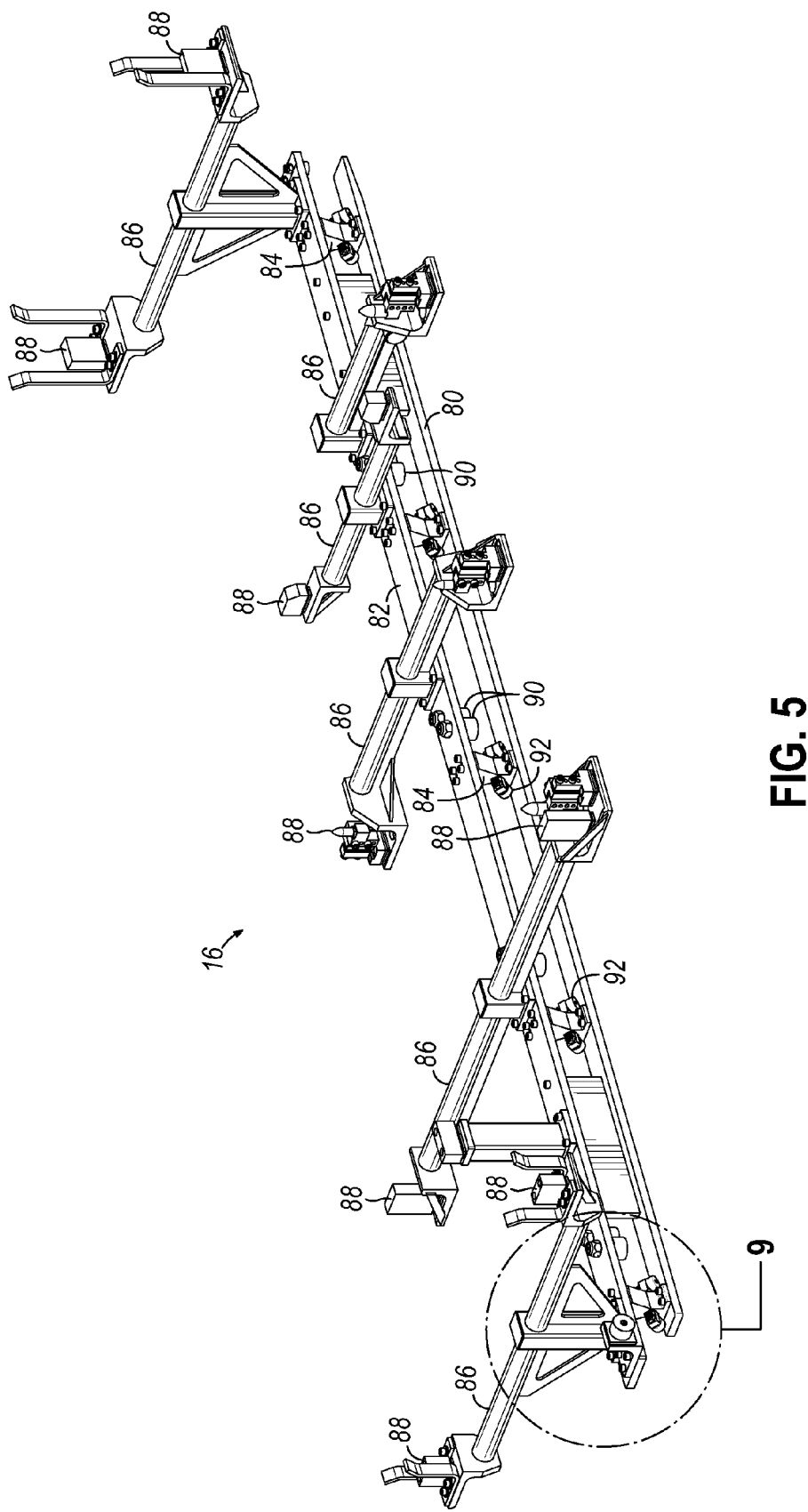
FIG. 5 is a perspective view of an exemplary carrier in accordance with the principles of the present invention.

FIG. 5. depicts an exemplary carrier 16 in accordance with the principles of the invention. A friction rail 80 is mated to a mounting rail 82 with a plurality of risers 84. The carrier 16 includes a friction rail 80 and mounting rail 82 joined with a riser 84 using, for example, threaded fasteners, welding, rivets, or other suitable methods of attachment. A plurality of transverse supports 86 are mounted in a perpendicular orientation with respect to the mounting rail 82. The transverse supports 86 terminate in a plurality of load bearing surfaces 88. The load bearing surfaces 88 are configured to support the various portions and sub-assemblies of the automotive body as the carrier 16 and cooperating auto body components travel down the track 14. A plurality of parallel rollers 90 and angled rollers 92 cooperate with mating surfaces on the track 14 and stabilize the carrier 16 as it travels down the track 14. The engagement between the parallel rollers 90 and angled rollers 92 will be shown in detail in the following figures.

Figure 6:
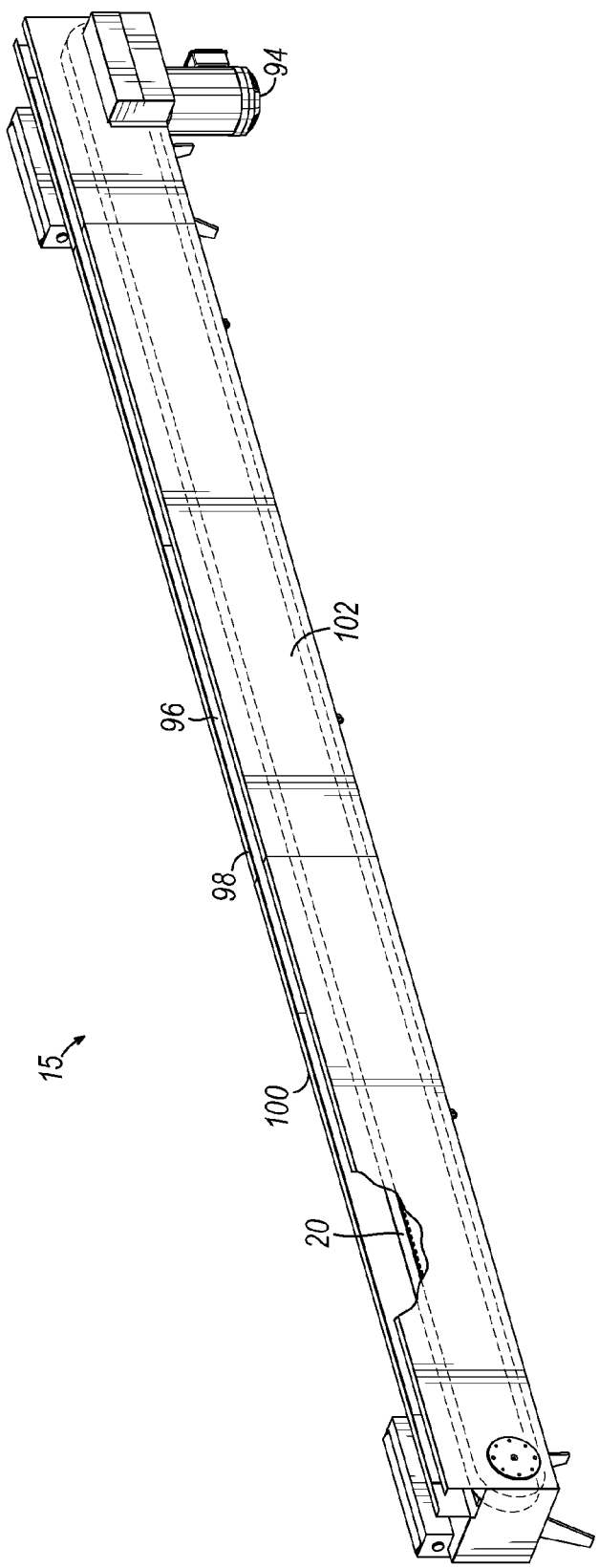
FIG. 6 is a perspective view of an exemplary track segment in accordance with the principles of the present invention.

FIG. 6 depicts an exemplary track segment 15, and illustrates the nested belt segment 20 therein. A belt motor 94 may be operated by a motor controller (not shown) to drive the belt segment 20 of one track segment 15 independently from other belt segments 20. As illustrated below with respect to FIGS. 7-10, the carrier 16 rides within a channel 96 defined by a top surface 98, a first rail 100, a second rail 102, and the belt segment 20. Bearing surfaces of the first rail 100 and second rail 102 may be fabricated from SAE 4140 steel in some embodiments of the invention. The friction rail 80, parallel rollers 90, and angular rollers 92 of the carrier 16 generally travel below the top surface 98 of the rail 14 while the mounting rail 82 and transverse supports 86 ride above the top surface 98 of the rail 14.

Figure 7:
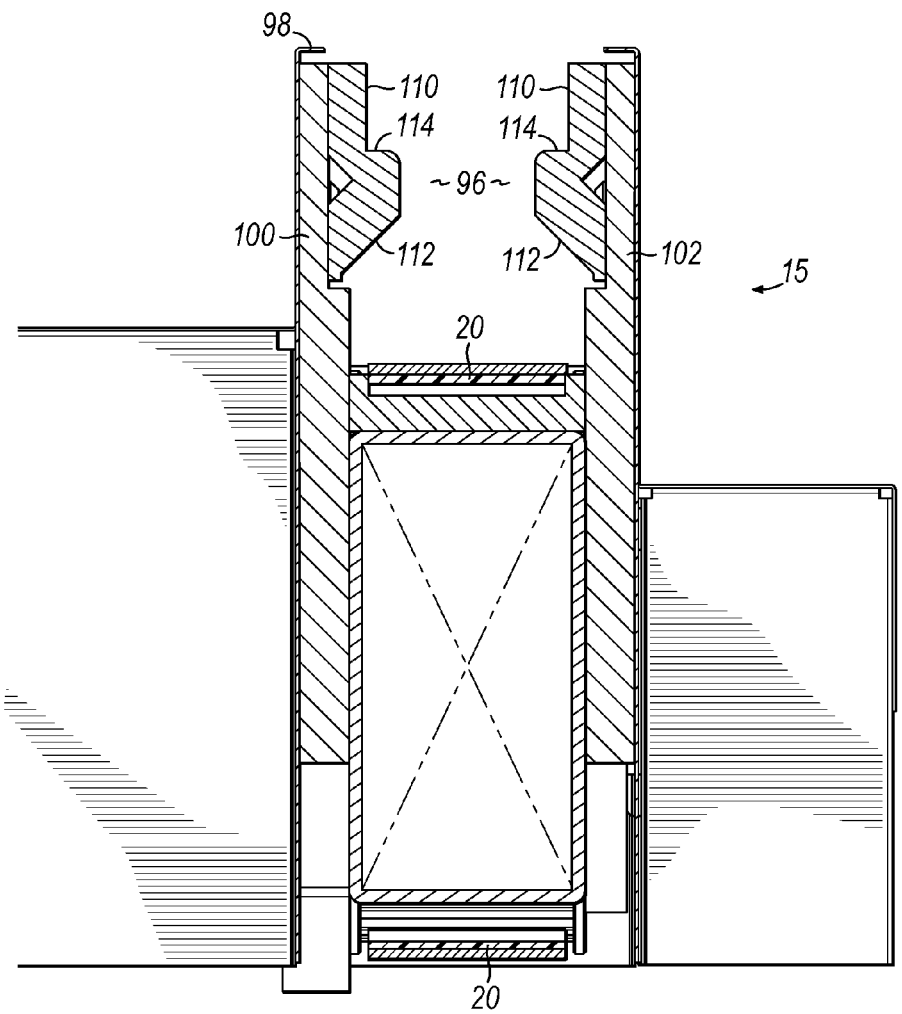
FIG. 7 is a partial cross-sectional view of the track segment of FIG. 6, taken along line 7-7.
Figure 8:
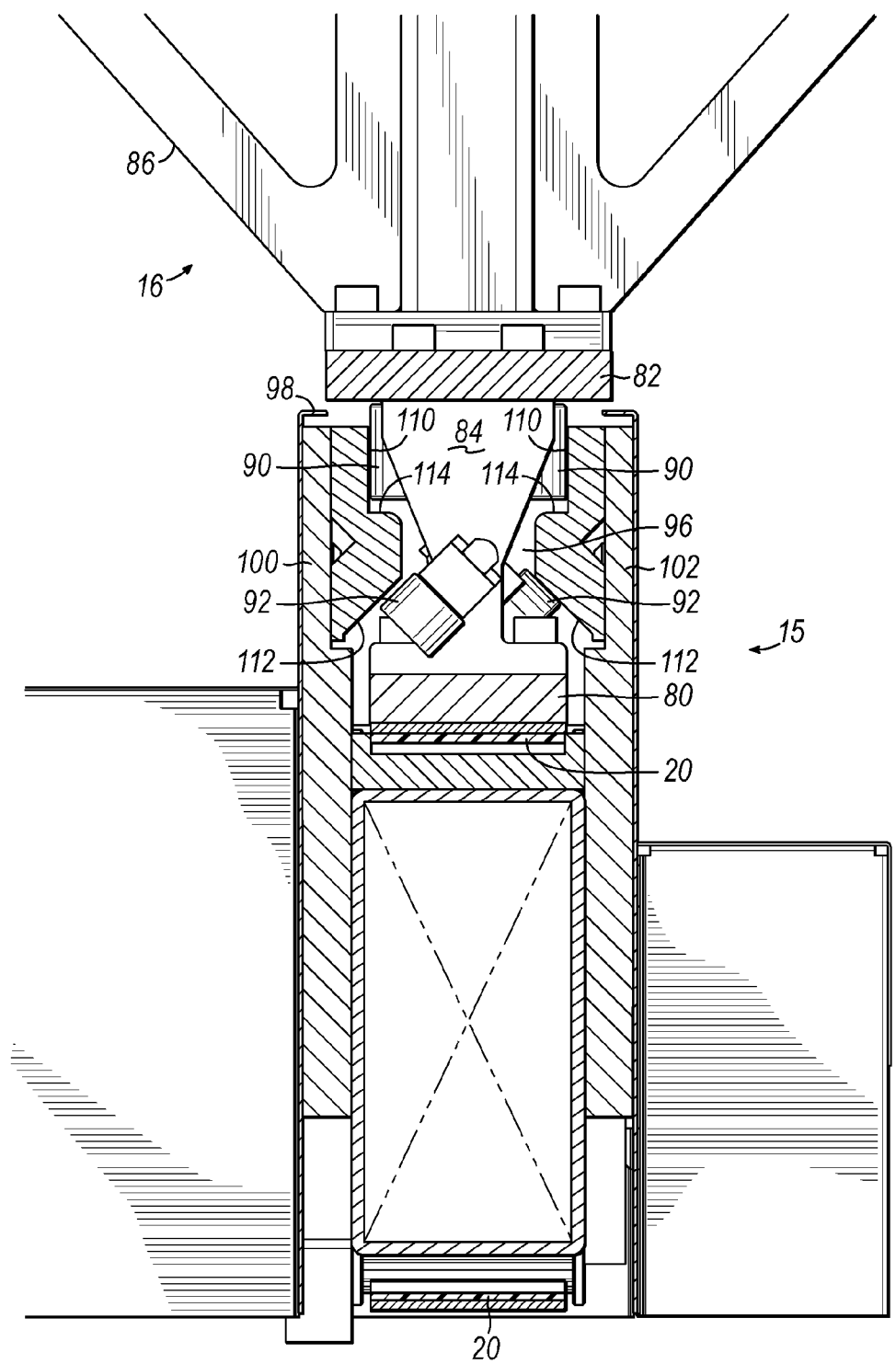
FIG. 8 is a partial cross-sectional view of the track segment of FIG. 7, further illustrating a carrier coupled with the track segment.

Referring now to FIGS. 7-10, coupling of a carrier 16 to a track segment 15 is described. FIG. 7 shows a detailed cross-sectional view of the track segment 15. The first rail 100 and second rail 102 are generally symmetric and the individual features of the first rail 100 equally apply to the second rail 102. The parallel face 110 of the track segment 15 and a cooperating parallel roller 90 on the carrier 16 serve to generally guide the carrier 16 axially along the track segment 15. An angled face 112 of the track segment 15 and a cooperating angled roller 92 on the carrier 16 serve to trap the carrier 16 within the channel 94 of the track segment 15. The angled rollers 92 and cooperating angled face 112 serve to keep the carrier 16 in constant frictional relationship with the belt segment 20. Under normal operating conditions, the parallel rollers 90 are suspended above the non-contact face 114 by lifting forces that are exerted upon the friction rail 80 by the belt segment 20. At certain portions of the system 10, the first rail 100 and second rail 102 are held in a moveable relationship with each other. This enables the first rail 100 and second rail 102 to be separated from each other for the purpose of coupling and decoupling the carrier 16 from the track segment 15. FIG. 8 shows an end view of the cooperation between carrier 16 and its rollers 90 and 92 and the track segment 15 and its faces 110 and 112.

Figure 9:
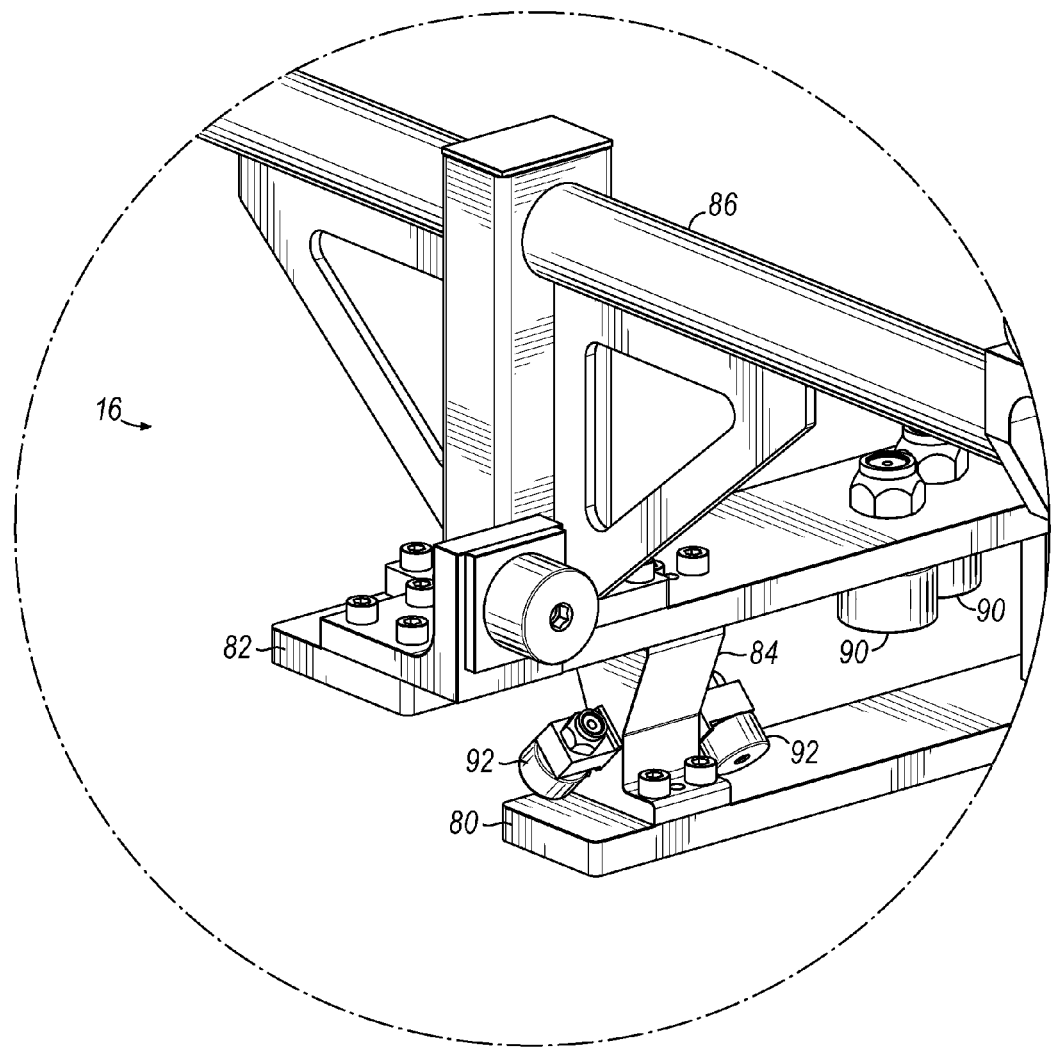
FIG. 9 is a detail view of the encircled area of FIG. 5.
Figure 10:
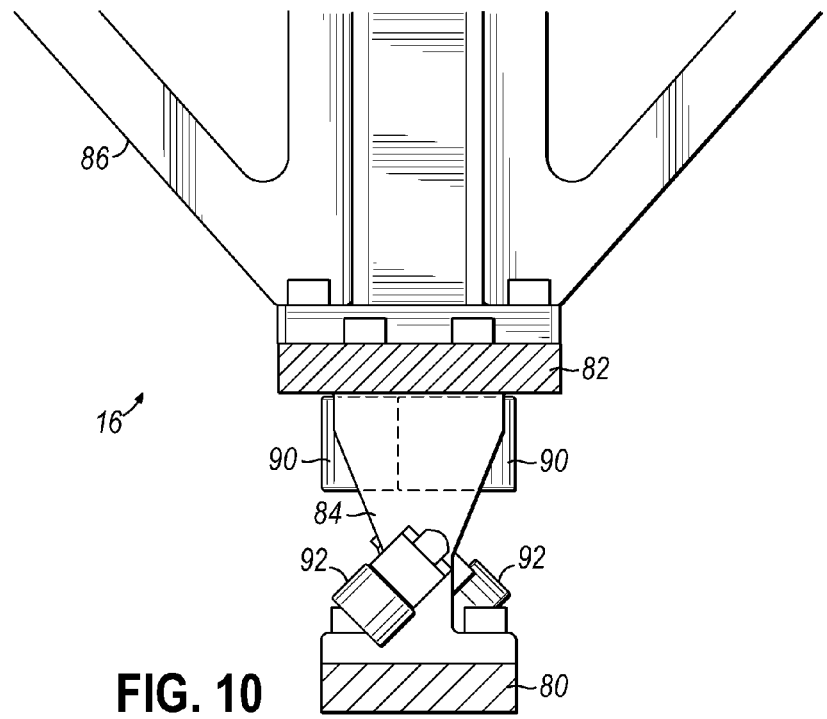
FIG. 10 is an end view of the carrier of FIG. 5, further illustrating the configuration of rollers.

With reference to FIGS. 9 and 10, the angled rollers 92 of the carrier 16 are mated to the riser 84 and are disposed such that the contact surfaces of the angled rollers 92 form a substantially forty-five degree angle with respect to the friction rail 80 and mounting rail 82. The center lines of rotation of the angled rollers 92 form right angles with respect to each other. It will be appreciated that various other angular orientations may produce acceptable results, assuming that mating surfaces on the track 14 are dimensioned appropriately. The parallel rollers 90 are mated to the mounting rail 82 to reduce lateral play between the carrier 16 and track 14.

Figure 11:
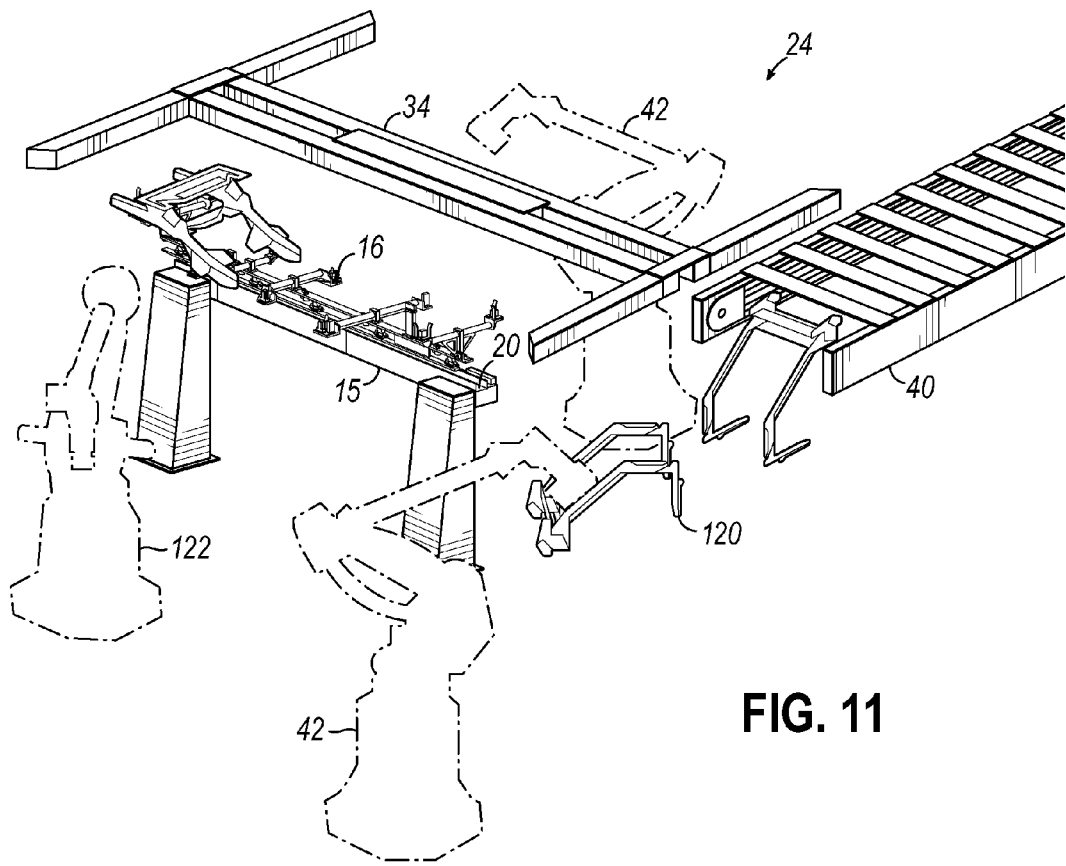
FIG. 11 is a perspective view of an exemplary component placement station in accordance with the principles of the present invention.

FIG. 11 illustrates an exemplary component placement station 24 with a track segment 15 and carrier 16 located therein. This configuration is achieved by using a beginning transfer robot 122 to transfer an empty carrier 16 from the overhead return track 34 onto the track segment 15 of component placement station 24. A similar end transfer robot 124 depicted in FIG. 14) is located at the end of the line 22 and is configured to take the empty carrier 16 from the offload station 32 and place the carrier 16 onto the overhead return track 34. Once the carrier 16 is placed on the track segment 15, the belt segment 20 is decoupled from the belt motor 94 (not shown) thereby placing the belt segment 20 in a freewheeling configuration. A shot pin package (not shown) locks the carrier 16 at the appropriate location along the track segment 15. This stabilizes the carrier 16 in preparation for receiving automotive body parts. Once the empty carrier 16 has been spatially oriented in the component placement station 24, a robot 42 places a first body component 120 onto the carrier 16. The first body component 120 is fed to the component placement system by the feed conveyor 40. The robot 42 repetitively transfers a new first body component 120 from the feed conveyor 40 upon each empty carrier 16 entering the component placement station 24. Once the appropriate number of auto body components is added to the carrier 16, the shot pin package (not shown) retracts, the belt segment 20 is re-coupled to the belt motor 94 (not shown), and the carrier 16 is advanced to the next station 12.

Figure 12:
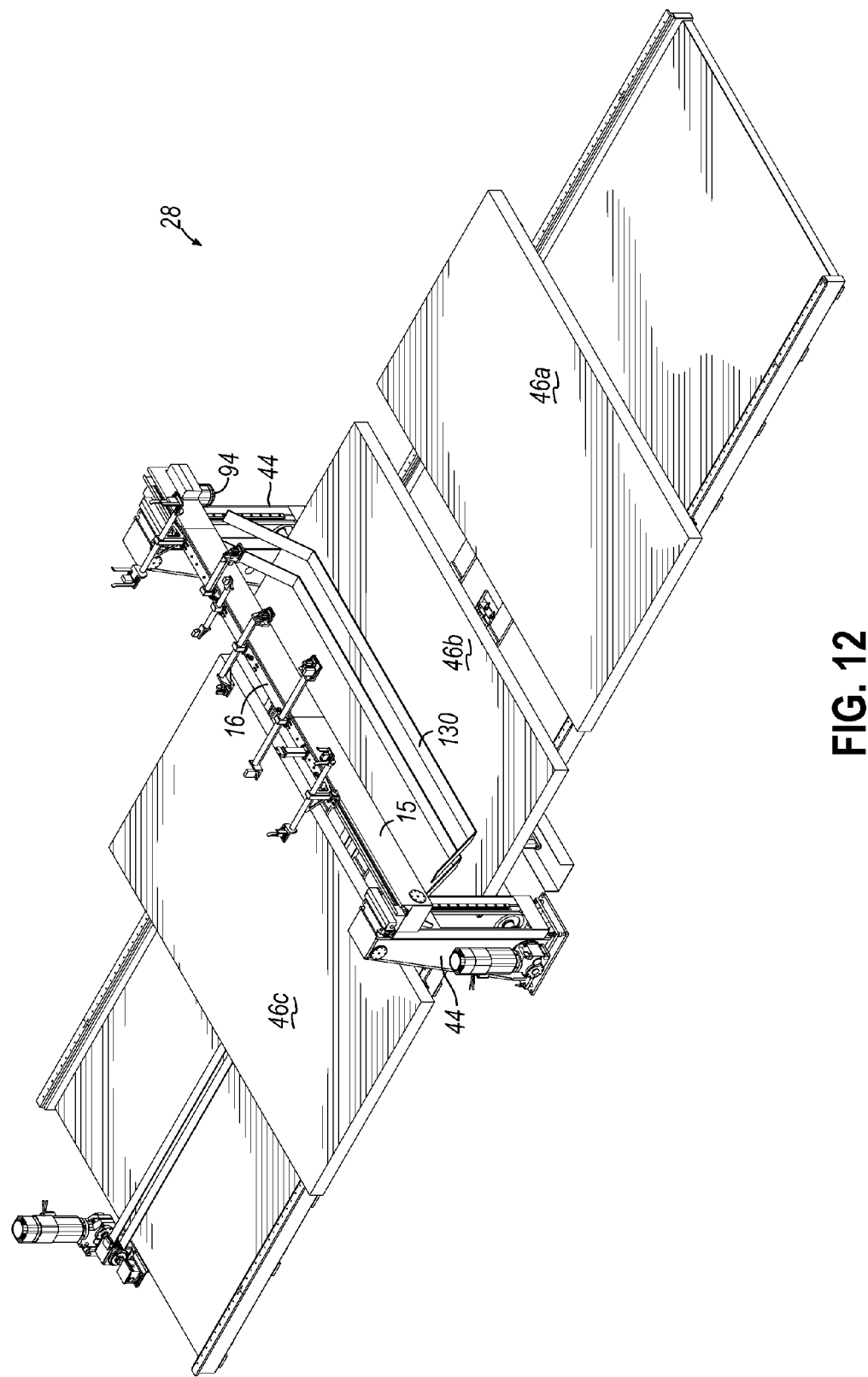
FIG. 12 is a perspective view of an exemplary geo-tool station in accordance with the principles of the present invention.

FIG. 12 depicts an exemplary geo-tool 28 in accordance with the principles of the invention. The geo-tool trays 46a-46c are positioned underneath the track segment 15. In this embodiment, geo-tool tray 46b is selected to interact with the carrier 16. A pair of vertical translation towers 44 suspend the track segment 15 above the geo-tool tray 46b. Once the belt motor 94 has positioned the carrier 16 in a generally acceptable linear position above the geo-tool tray 46b, the belt motor 94 is decoupled from the belt segment 20 allowing the carrier 16 to freely move fore and aft. As the vertical translation towers 44 lower the track segment 15 toward the geo-tool tray 46b the carrier 16 is guided into final alignment with the geo-tool tray 46b by angled surfaces of a yoke 130. This final guiding is accomplished with very little opposition since the belt motor 94 has been decoupled from the belt segment 20 as described earlier. Once the carrier 16 has been lowered into the yoke 130, the various fixtures and clamping components of the geo-tool tray 46b grasp the automotive body parts. Preliminary welding is completed and the carrier 16 and track segment 15 are raised by the vertical translation towers 44 in preparation of moving the carrier 16 to the next station 12.

Figure 13:
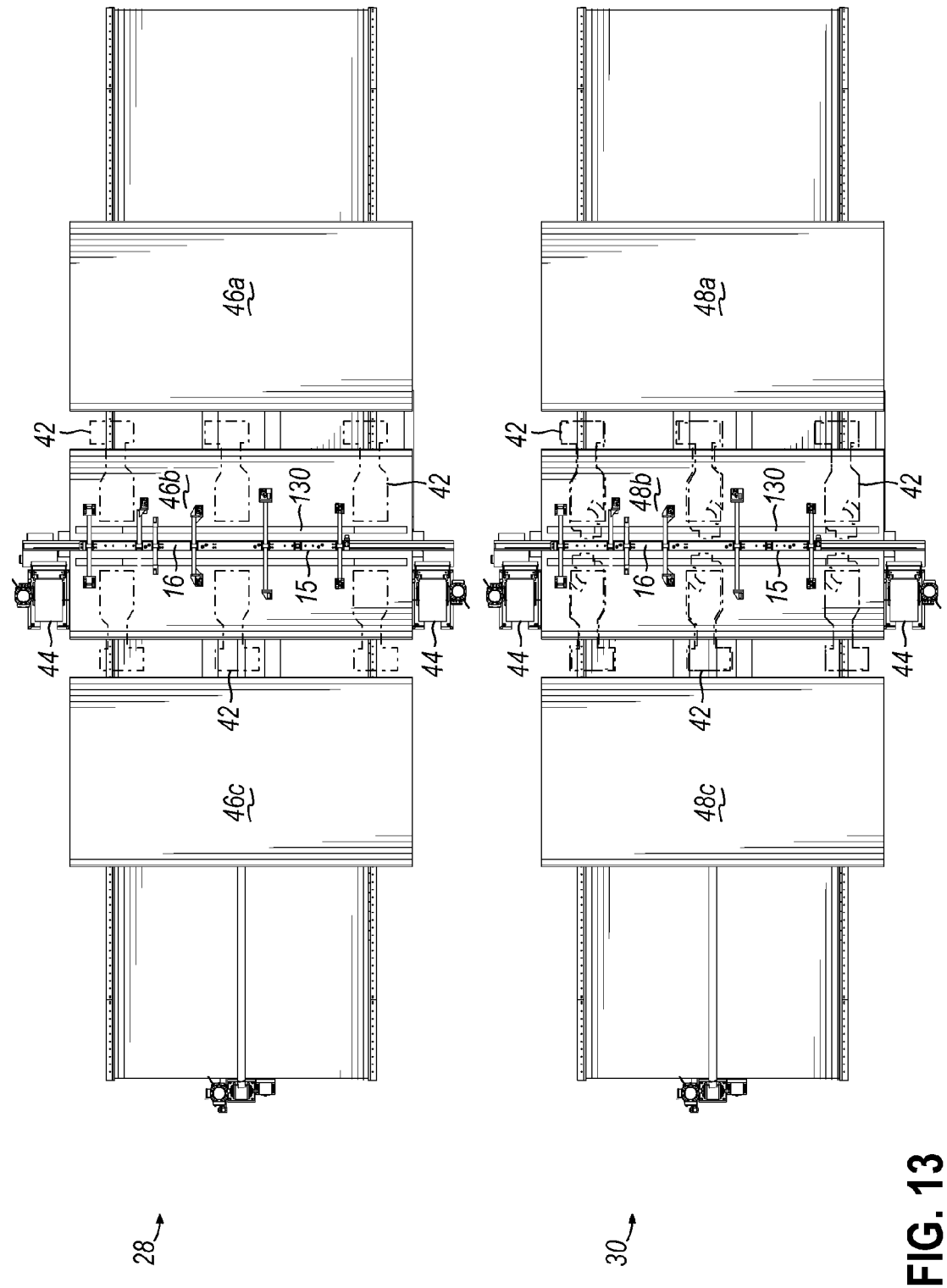
FIG. 13 is a top plan view of exemplary geo-tool stations of in accordance with the principles of the present invention.

FIG. 13 is a plan view of the geo-tool shown in FIG. 12, and further illustrates a re-spot tool 30 and a plurality of robots 42. The geo-tool 28 and re-spot tool 30 are virtually identical in this view, however the two stations 12 are distinguished by their respective functions. As described above, the geo-tool 28 is primarily concerned with orienting the automotive body parts with respect to each other and temporarily securing them with welds. Similarly, the re-spot tool 30 is concerned with providing additional structural welding to complete the assembly of the various components oriented by the geo-tool 28.

Figure 14:
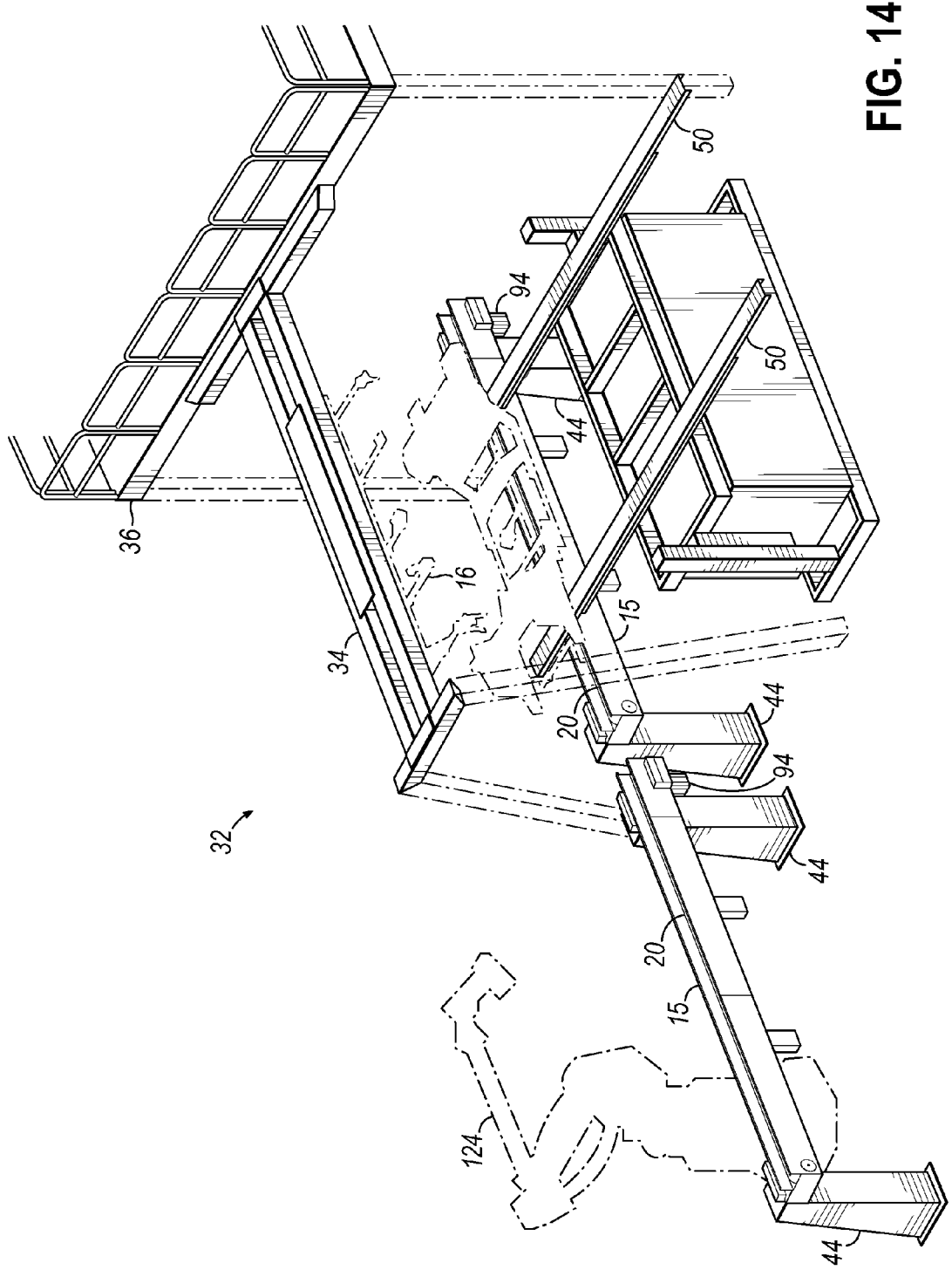
FIG. 14 is a perspective view of an exemplary offload station in accordance with the principles of the present invention.

FIG. 14 depicts an exemplary offload station 32 in accordance with the principles of the invention. Here, the lifting forks 50 have been positioned between the automotive body and the carrier 16. The vertical translation towers 44 will lower the track segment 15 so that the weight of the automotive body components is removed from the carrier 16 and placed upon the transfer forks 50. The transfer forks 50 will then withdraw away from the track segment 15, and the carrier 16 will then be free of automotive body parts. An end transfer robot 124 will remove the carrier 16 from the track segment 15. The end transfer robot 124 (not shown) will then invert the carrier 16 so that the friction rail 80 is facing upward. The carrier 16 will then be coupled to the overhead return track 34, and the carrier 16 will travel from the end of the line 22 back to the beginning of the line 18 using friction rollers, belt drives, or other means known to the art.

Figure 15:
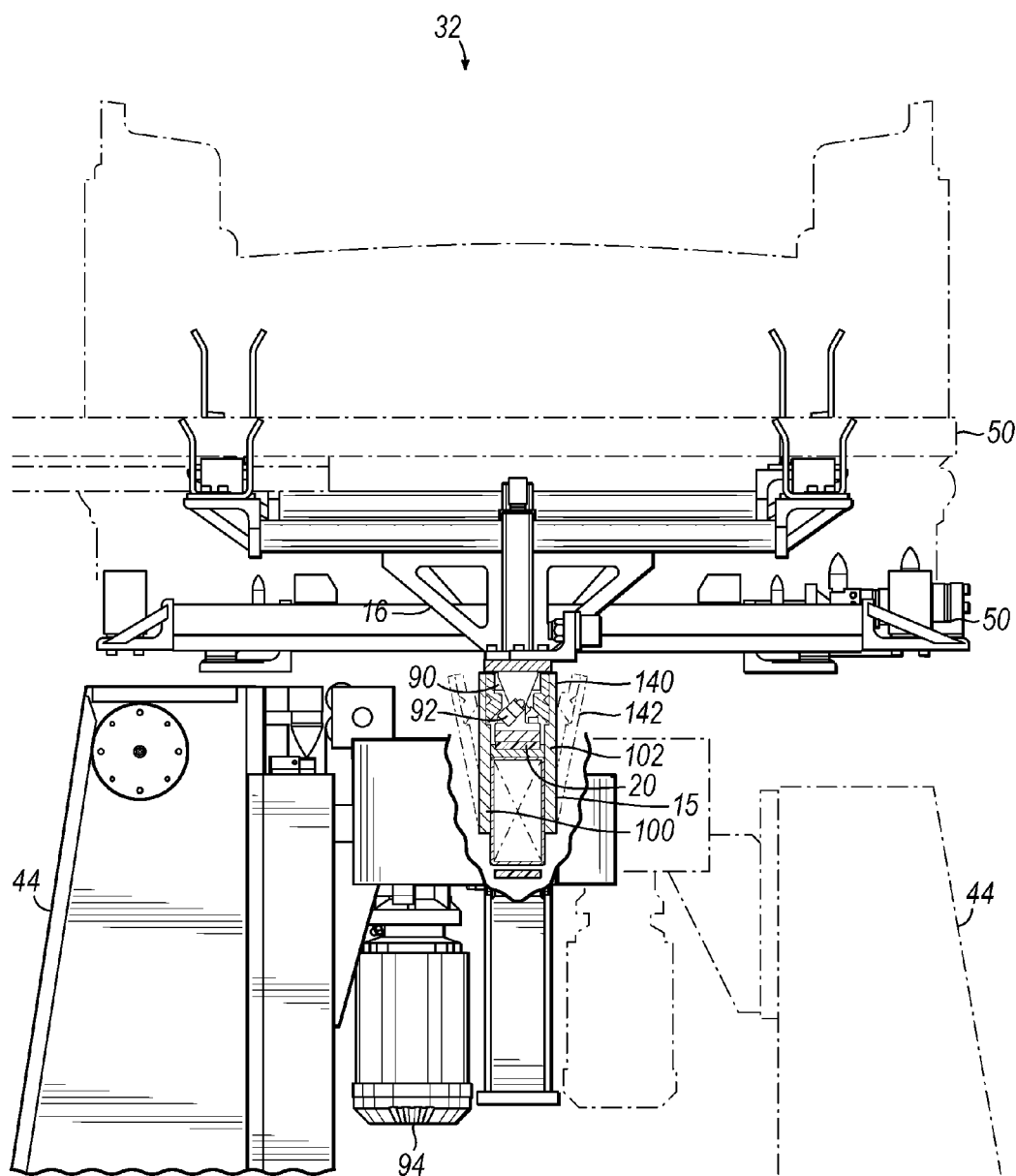
FIG. 15 is an end elevation view the offload station of FIG. 14.

FIG. 15 depicts an end view of the offload station 32. The track segment 15 is shown in two possible configurations. In a first configuration 140, illustrated in solid lines, the track segment 15 engages the carrier 16. In a second configuration 142, illustrated in phantom lines, the track segment 15 is unlocked, or disengaged from, the carrier 16. In this second condition 142, the first rail 100 and second rail 102 have been pivoted away from the carrier 16 by a track manipulator 144 shown in more detail in FIG. 19. In the second condition 142, the parallel rollers 90 and angular rollers 92 are taken out of contact with their corresponding surfaces on the first track 100 and second track 102. This allows the carrier 16 to be freely lifted from the track segment 15 by the lifting forks 50. This same configuration may be used to couple and decouple the carrier 16 to the overhead return track 34 at the beginning of the line 18 and the end of the line 22. Likewise, this configuration may be used to couple the carrier 16 to the first track segment 15 at the beginning of the line 18.

Figure 16:
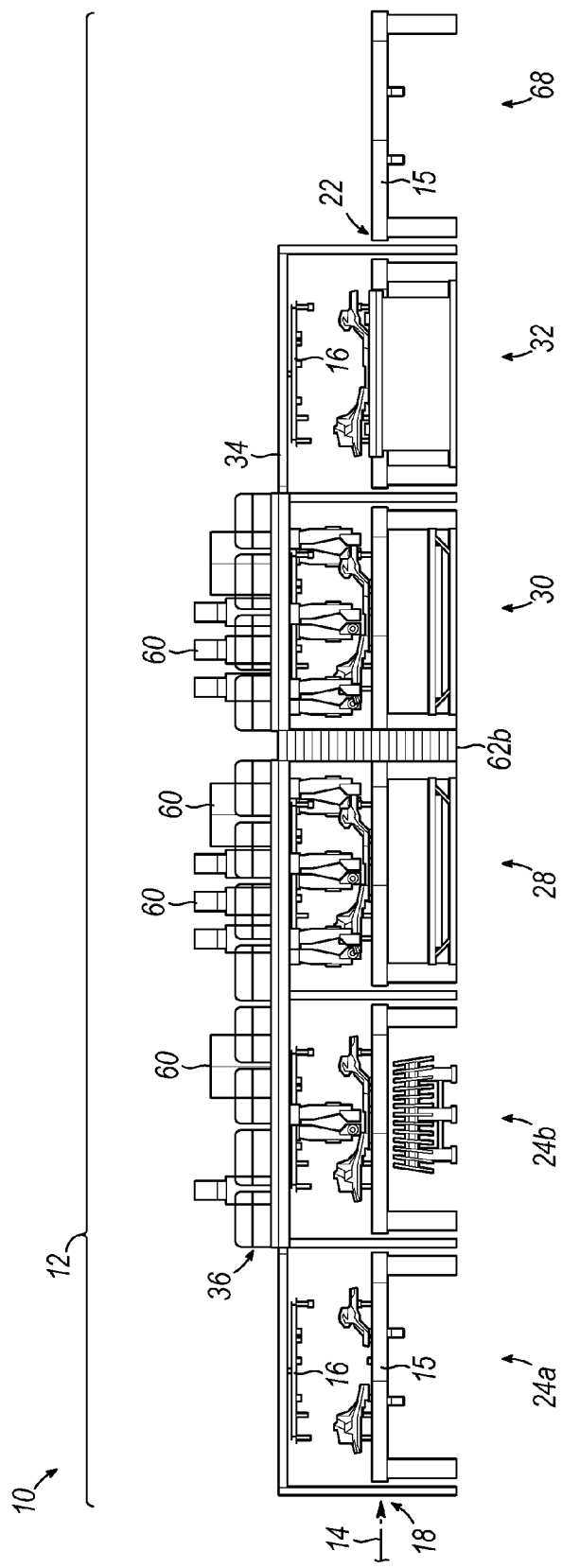
FIG. 16 is a side elevation view of the conveyance system of FIG. 4, illustrating an overhead return track and catwalk.

FIG. 16 depicts a more detailed side elevation view of the conveyance system 10. Starting at the beginning of the line 18 and progressing to the end of the line 22, a pair of component placement stations 24a and 24b are shown. A geo-tool 28, re-spot tool 30, and offload station 32 complete the assembly line. A repair station 68 follows the offload station 32 but is not deemed part of the assembly line itself. A plurality of carriers 16 are shown coupled to the overhead return track 34.

The overhead return track 34 is disposed between the track 14 and the catwalk 36, and the stairway 62b provides user access to the catwalk 36. Since the return track 34 does not impinge upon the floor space of the catwalk 36, a user is free to service the various pieces of equipment 60 throughout all areas of the catwalk 36.

Figure 17:
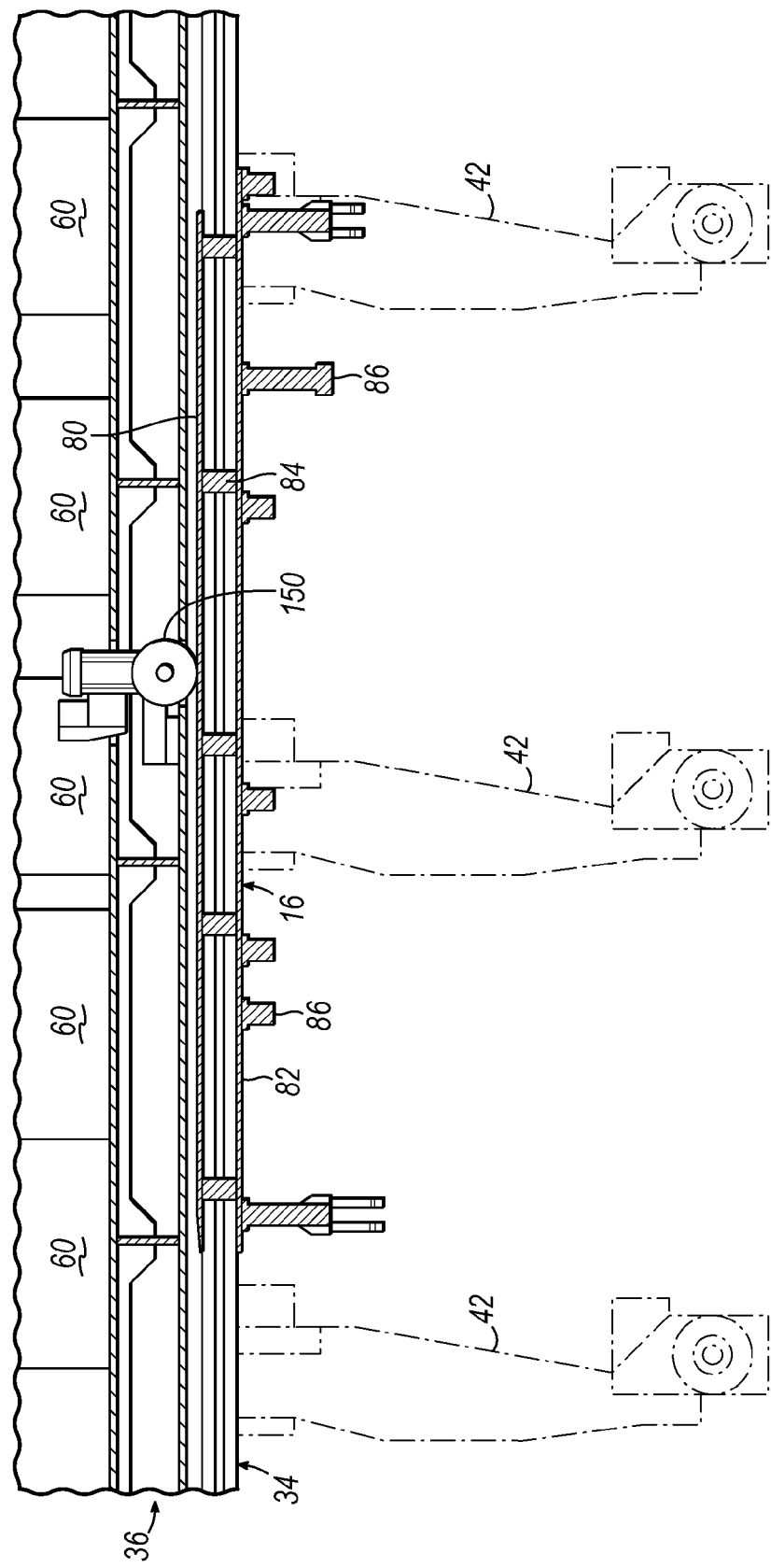
FIG. 17 is enlarged side elevation view of the overhead return track of FIG. 16.

FIG. 17 is a detailed side elevation view of the overhead return track 34. A carrier 16 is coupled with the overhead return track 34 and is astride a plurality of robots 42. The catwalk 36 supports a variety of equipment 60. In one embodiment, a friction roller 150 is in intermittent contact with the friction rail 80 of the carrier 16 and serves to propel the carrier 16 from the end of the line 22 to the beginning of the line 18.

Figure 18:
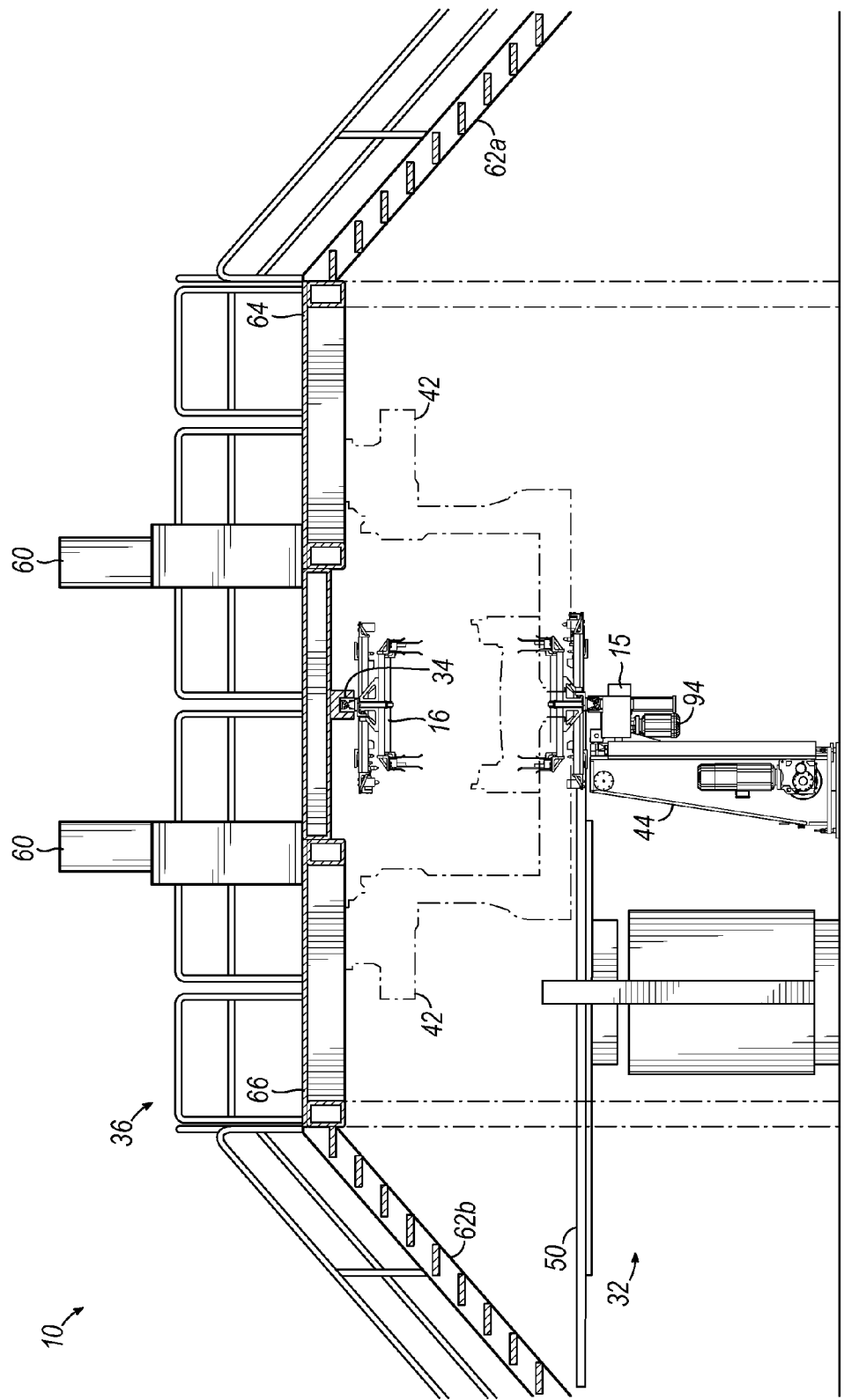
FIG. 18 is a partial cross-sectional elevation view taken along line 18-18 of FIG. 16.

FIG. 18 is an end elevation view of the conveyance system 10 taken along line 18-18 of FIG. 16, looking down the track 14. The overhead return track 34 and mated carrier 16 do not obstruct the catwalk 36 in any way. A worker going up on the left side 64 using the stair 62a is able to freely move about the catwalk 36 and descend the opposing stair 62b on the right side 66.

Figure 19:
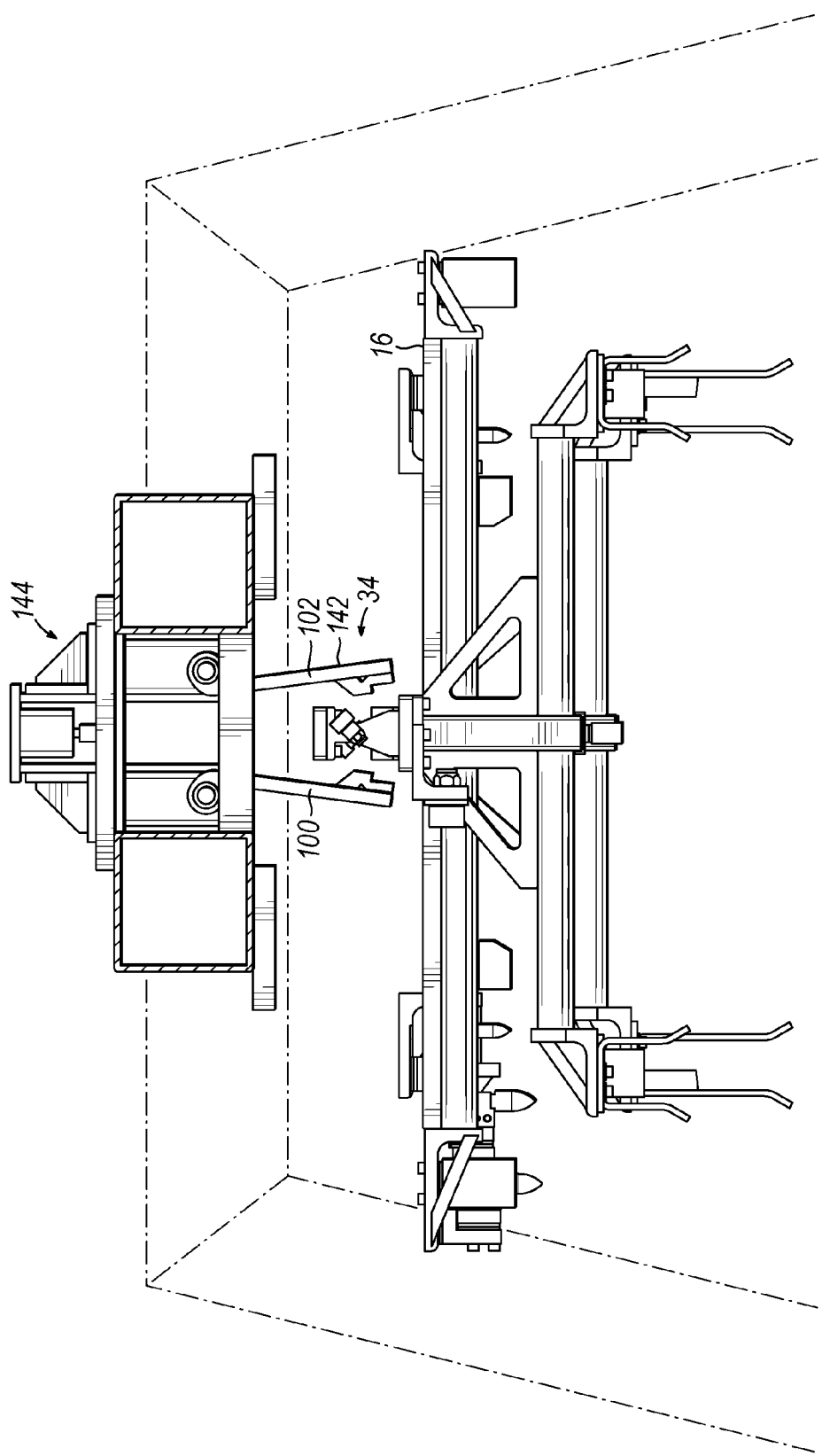
FIG. 19 is enlarged detail view of the return track of FIG. 18.

FIG. 19 is a detail view of the overhead return track 34 and carrier 16. In this view, the overhead return track 34 is shown in the second configuration 142, wherein the first rail 100 and second rail 102 are decoupled from the carrier 16. The track manipulator 144 has been activated to separate the first rail 100 from the second rail 102 and thereby allow the carrier 16 to be decoupled from the overhead return track 34.

Figure 20:
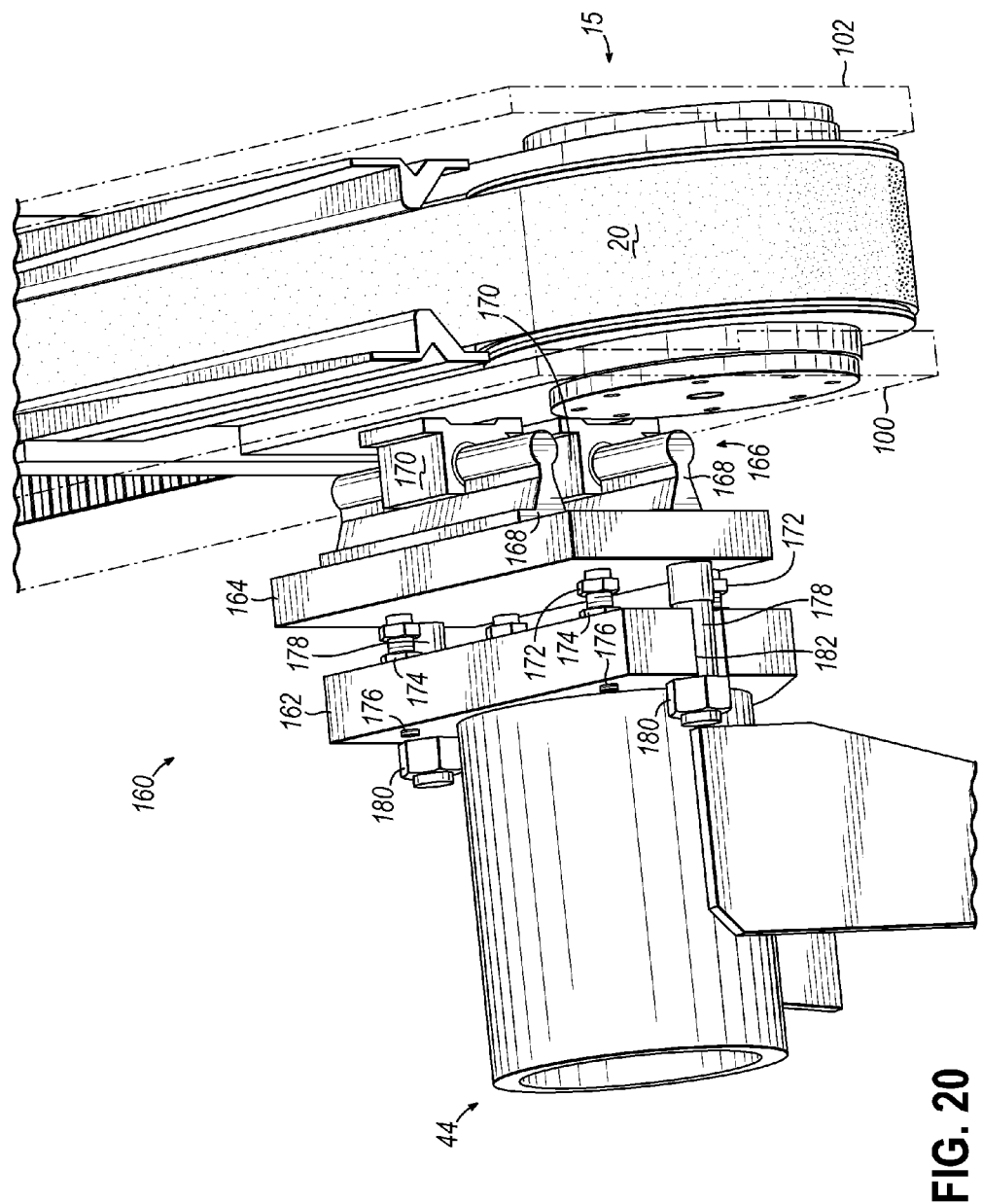
FIG. 20 is a perspective view of an exemplary adjustable mounting assembly in accordance with the principles of the present invention.

FIG. 20 shows a precision adjustable mounting assembly 160 used to join the vertical translation towers 44 to the track segment 15. The system 10 necessitates a high degree of alignment accuracy between track segments 15, and therefore a highly precise and robust method of adjusting the alignment of track segments 15 is required. A first plate 162 is attached to the vertical translation tower 44. Likewise, a second plate 164 is mated to the track segment 15 by a load distribution assembly 166. In one embodiment, the load distribution assembly 166 includes two or more projections 168 and cooperating receivers 170. The interface between the projections 168 and receivers 170 are configured to provide enhanced rigidity to the interface between second plate 164 and the track segment 15. This also aids in preventing twisting of the track segment 15 when under non-symmetric loads created by the carrier 16.

A plurality of jack screws 172 and lock nuts 174 are disposed between the first plate 162 and second plate 164. The jack screws 162 are received in a plurality of threaded holes 176 in the first plate 162. The opposing sides of the jack screws 172 sit in cooperating pockets (not shown) of the second plate 164. Rotating the jack screws in a counterclockwise direction (when configured with right-hand threads) causes the second plate 164 to be driven from the first plate 162 at a location centered about the actuated jack screw 172. By adjusting the plurality of jack screws 172, pitch, yaw, and roll of the track segment 15 may be adjusted. A plurality of load pins 178 bear most of the weight applied to the precision adjustable mounting assembly 160. Once the plurality of jack screws 172 are adjusted to appropriate position, the lock nuts 174 are tightened to secure the orientation of the jack screws 172. Additionally, a plurality of load pin nuts 180 are tightened to keep the first plate 162 and second plate 164 pulled in a fixed relationship with each other, and the keep the jack screws 172 seated within the pockets (not shown). To provide an enhanced degree of articulation, the load pins 178 are disposed in load pin bores 182 that are dimensioned slightly larger than the load pins 178. This allows the second plate 164 to roll, pitch, and yaw along with its cooperating track segment 15 during adjustment.

Figure 21:
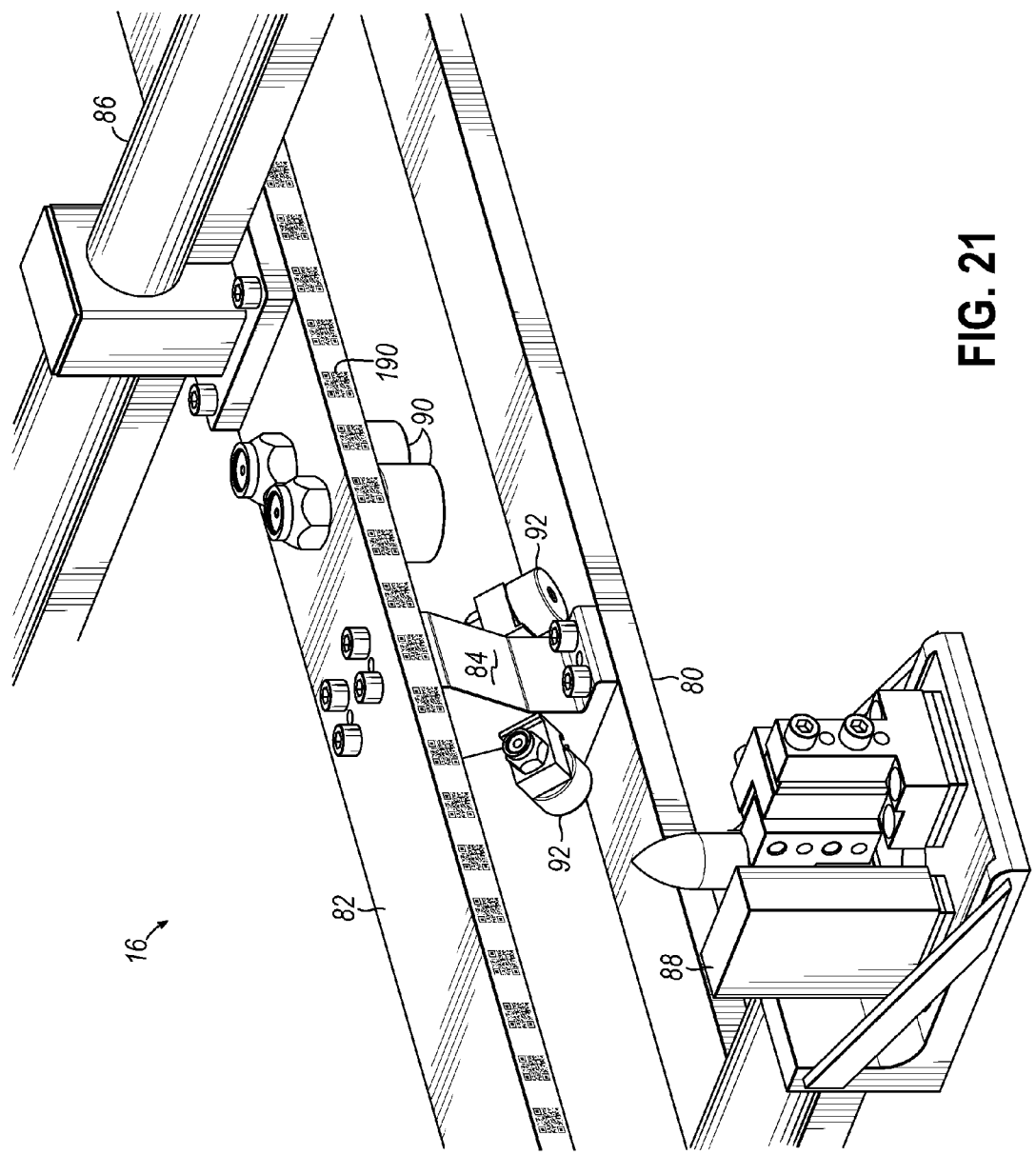
FIG. 21 is a perspective view of an exemplary carrier including a data matrix strip in accordance with the principles of the present invention.

FIG. 21 depicts an optional additional feature of the conveyance system 10 that provides additional motion control of the carrier 16 as it progresses through the track segments 15. In this embodiment, a data matrix 190 may be affixed to a side of the mounting rail 82. The data matrix 190 contains unique two-dimensional indicia capable of uniquely identifying each carrier 16 and its relative position throughout the system 10. Since each belt segment 20 of the system 10 is individually drive by its respective belt motor 94, each carrier 16 may be independently moved, stopped, accelerated, decelerated, reversed, positioned, etc. throughout the system 10. The data matrix 190, along with at least one cooperating camera reader (not shown) provides the system 10 with enhanced quality control tracking, diagnostic features, and speed of throughput. Instead of relying on limit switches, to include stop switches and slow switches, the data matrix 190 allows the system 110 to readjust a particular carrier 16 even while adjacent carriers 16 are stationary. A carrier 16 may be rapidly progressed through idle or vacant stations 12 by use of the data matrix 190 in conjunction with independently controlled belt motors 94. In addition to the enhanced motion control, increased productivity, quality control, and trouble-shooting is accomplished by uniquely identifying each carrier 16 as it progresses through the system 10. The system 10 using the data matrix 190 can uniquely identify and track a defective carrier 16 or carrier 16 that otherwise causes stoppages in the manufacturing process or yields defective finished products.

Figure 22:
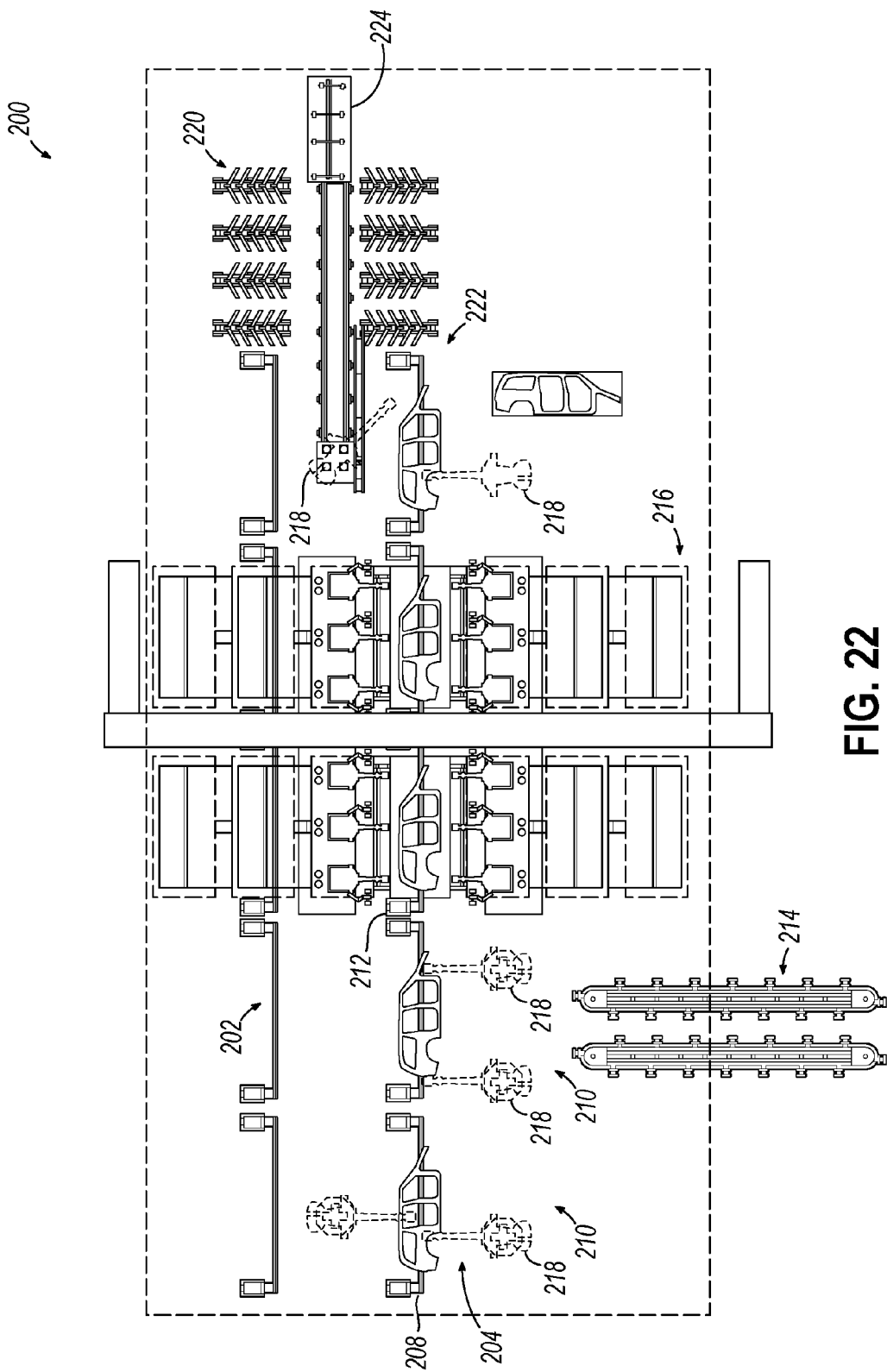
FIG. 22 is a schematic top plan view of an assembly line including another exemplary conveyance system in accordance with the principles of the present invention.

Referring now to FIGS. 22-26, another exemplary embodiment of a flexible conveyance system 200 in accordance with the principles of the present invention will be described. The conveyance system 200 of this embodiment is similar in many aspects to the conveyance system 10 described above with respect to FIGS. 1-21. Accordingly, only the differences between the systems will be described further below. FIG. 22 depicts a schematic illustration of a conveyance system 200 similar to the conveyance system 10 discussed above with respect to FIG. 3. However, instead of an overhead return line, the conveyance system 200 includes an optional return line 202 that is spaced laterally from the feed-forward line 204 and, in this embodiment, extends generally parallel to a feed-forward line 204 to return carriers 206 toward the beginning 208 of the feed-forward line 204. Various other aspects of the conveyance system 200 are similar to the conveyance system 10 described above, including the various stations 210 for loading and unloading components to a carrier 206, vertical translation towers 212 for raising and lowering carriers 206 relative to the assembly line, component feed conveyors 214, geo tool trays 216, and robotic manipulators 218 for performing assembly operations.

As illustrated in FIG. 22, a storage area 220 may be provided adjacent the offload station 222 at the end of the feed-forward line 204, for storing carriers 206 that have been removed from the feed-forward line 204 by a robot. A repair station 224 may also be provided adjacent the storage area 220, for repairing or adjusting carriers 206 as generally described above.

Figure 23:
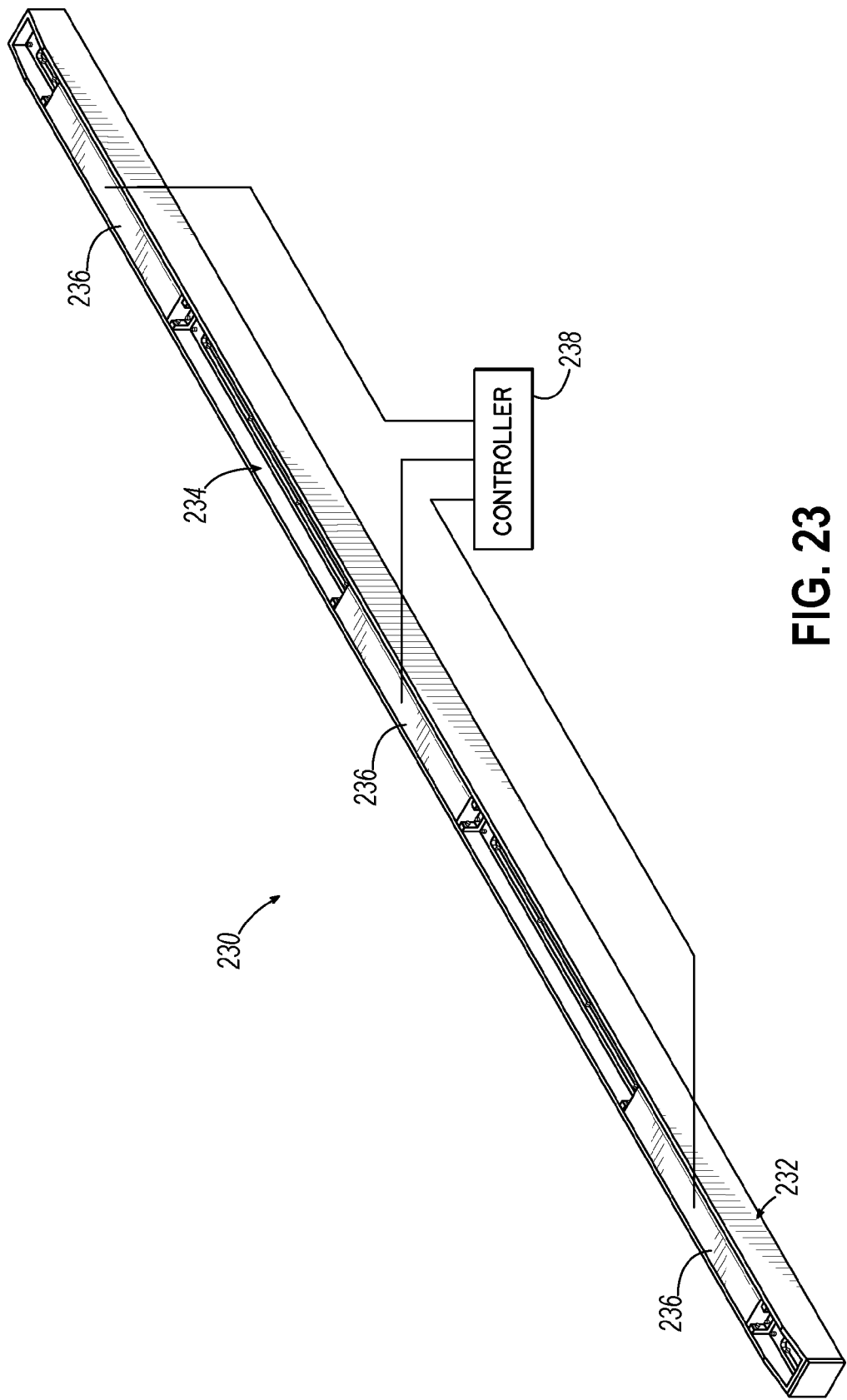
FIG. 23 is a perspective view of an exemplary track segment of the conveyance system of FIG. 22.

FIG. 23 depicts an exemplary track segment 230 used in both the feed-forward and return lines 202, 204. The track segment 230 includes an elongate track housing 232 having an open upper side defining an upwardly facing channel 234 that extends lengthwise along the track segment 230. At least one linear motor 236 is disposed within the channel 234 of each track segment 230 to control the movement of carriers 206 along the track segments 230. In the embodiment shown, three linear motors 236 are disposed in the channel 234 of the track segment 230. It will be appreciated, however, that each track segment 230 may alternatively include only a single linear motor 236, or various other numbers of linear motors 236 disposed in the channel 234 as may be desired. An exemplary linear motor 236 that may be used in the track segments 230 is the Quickstick HT2 available from MagneMotion, Inc., of Devens, Mass.

A controller 238 in communication with each linear motor 236 controls the operation of each linear motor 236 to move carriers 206 along the track segments 230 with high precision and independently of other carriers 206 supported on the plurality of track segments 230. While a single controller 238 is illustrated in communication with the linear motors 236, it will be appreciated that each linear motor 236 may alternatively be in communication with a dedicated controller that controls operation of that particular linear motor 236, in cooperation with other features of the conveyance system 200.

Figure 24:
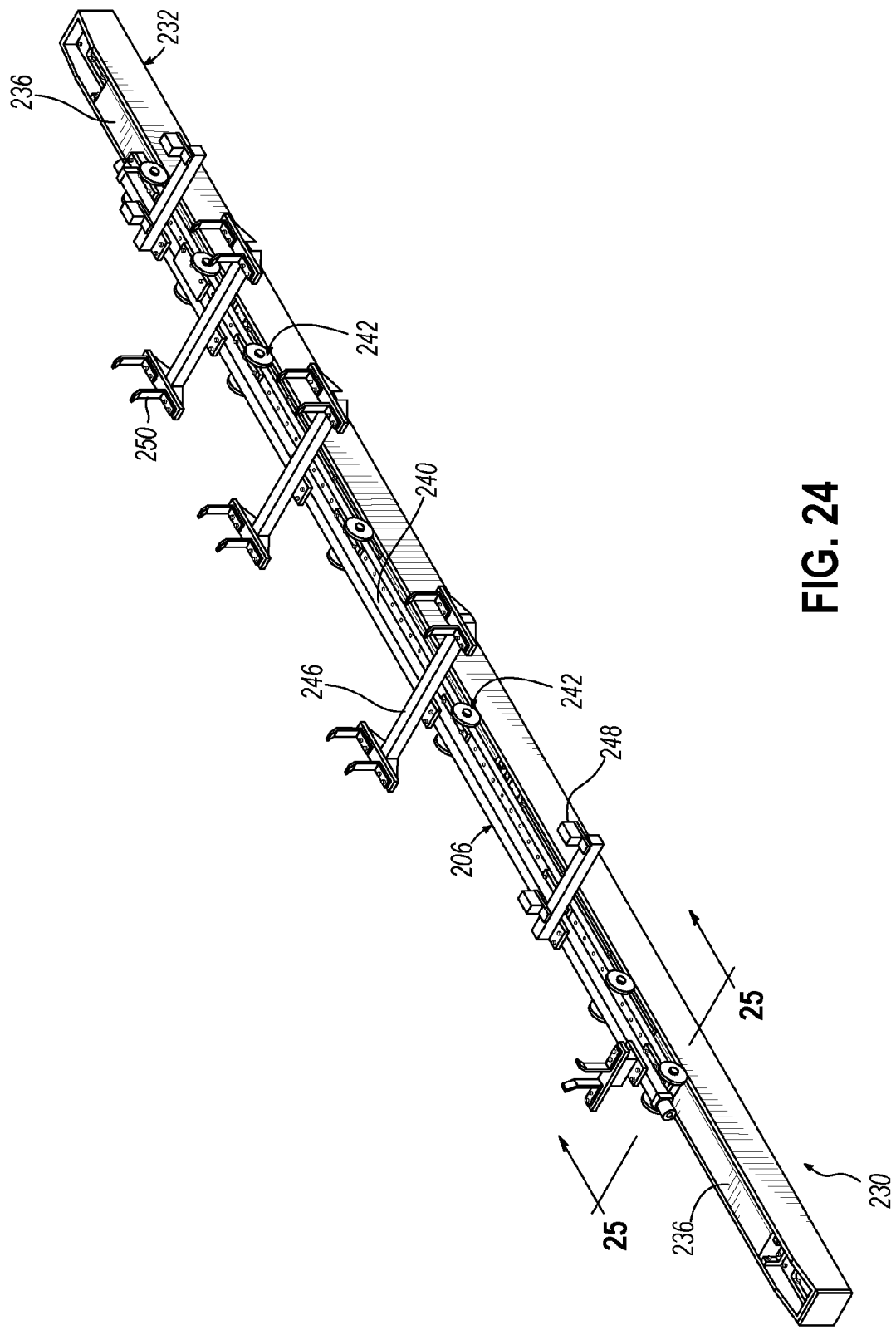
FIG. 24 is a perspective view of the track segment of FIG. 23, illustrating another exemplary carrier coupled with the track segment.
Figure 25:
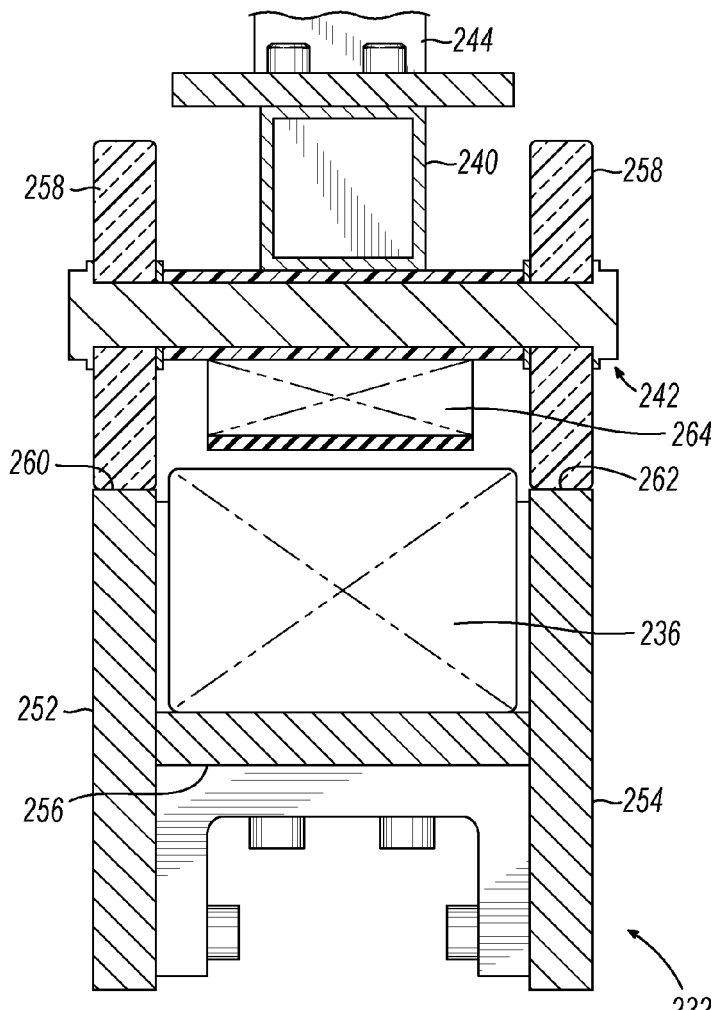
FIG. 25 is a partial cross-sectional view of the track segment and carrier of FIG. 24.

FIGS. 24 and 25 depict an exemplary carrier 206 in accordance with this embodiment, supported on a track segment 230. In this embodiment, the carrier 206 comprises an elongate mounting rail 240 to which a plurality of wheel assemblies 242 are coupled. A plurality of risers 244 are secured to an upper surface of the mounting rail 240, in a manner generally similar to the carriers 206 described above with respect to FIGS. 1-21. The risers 244 are in turn coupled with transverse supports 246 having load bearing surfaces 248 and appropriate fixtures 250 for supporting assembly components thereon. As seen in FIG. 25, the track housing 232 comprises first and second oppositely deposed sidewalls 252, 254 and a bottom wall 256, defining the channel 234 of the track housing 232. The wheel assemblies 242 of the carrier 206 are configured so that the wheels 258 engage the upper surfaces 260, 262 of the first and second sidewalls 252, 254 to provide rolling movement of the carrier 206 along the track segment 230. At least one permanent magnet 264 is secured to a lower surface of the mounting rail 240, generally opposite the risers 244. The permanent magnets 264 are supported on the mounting rails 240 of the carriers 206 at a fixed spacing from the linear motors 236.

Figure 26:
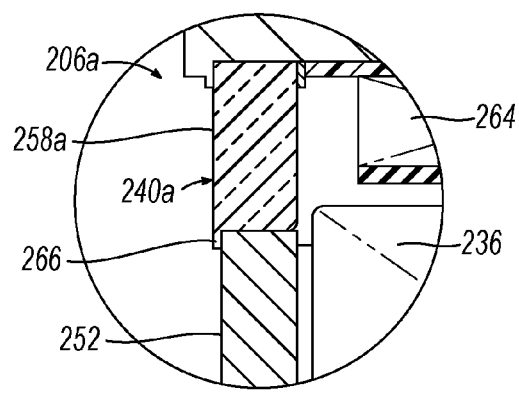
FIG. 26 is a detailed view of another embodiment of a carrier in accordance with the principles of the present invention and configured for use with the track segment of FIGS. 25 and 25.

FIG. 26 depicts another exemplary embodiment of a carrier 206a that can be used with the track segment 230 described with respect to FIGS. 24-25. In this embodiment, the wheels 258a of the wheel assemblies 240a include a radially outwardly extending circumferential lip 266 that cooperates with the sidewalls 252, 254 of the track housing 232 to facilitate alignment of the carrier 206a on the track segments 230.

In use, the linear motors 236 are actuated to create magnetic fields that cooperate with the permanent magnet 264 on the carrier 206 to provide the motive force for moving the carriers 206 along the plurality of track segments 230 and to precisely position the carriers 206 at desired locations along the track segments 230. Advantageously, the conveyance system 200 described herein provides a fast and efficient method for transferring assembly components along an assembly line, with real-time control of each carrier 206 independently of other carriers 206 moving along the assembly line. Moreover, the linear motors 236 cooperate with the permanent magnets to provide a significant hold down force that aids in the stability of the carriers 206 supported on the track segments 230. As the carriers 206 are moved along the track segments 230 of the feed-forward line 204, parts may be added and assembly operations may be performed at various stations 210 generally as described above with respect to the conveyance system 10 of FIGS. 1-21. While vertical translation towers 212 may be used to locate assembly components supported on the carriers 206 in a geo tool tray 216 as described above, the linear motors 236 provide such precise positioning of the carriers 206 on the track segments 230 that the use of vertical translation towers 212 to lower the components into a tool tray 216 may not be required.

At the end of the feed-forward line 204, completed assemblies may be removed from the carriers 206 by one or more robots 218. The unloaded carriers 206 may then be removed from the track segments 230 and placed into the storage area 220, sent to the repair station 224, or moved to the return line 202 to be transferred back toward the beginning 208 of the feed-forward line 204. In this embodiment, the return track segments 230 are similar in construction to the feed-forward track segments 230 discussed above with respect to FIGS. 23-26. The storage area facilitates adding and removing carriers 206 from the feed-forward line 204 and the return line 202 in various orders as nay be desired, so that carriers 206 may be provided to the beginning 208 of the feed-forward line 204 to accommodate changes in assembly requirements.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A flexible conveyance system, comprising:
    a plurality of feed-forward track segments aligned end-to-end, each feed-forward track segment having an open upper side defining an upwardly-facing channel extending lengthwise along the feed-forward track segment, and having at least one linear motor disposed within the channel; and
    at least one carrier supported for movement along the plurality of feed-forward track segments, each carrier including at least one magnet cooperating with the linear motors of the feed-forward track segments to move the carrier along the respective feed-forward track segments.

2. The flexible conveyance system of claim 1, wherein the at least one carrier comprises:
    a mounting rail;
    a plurality of wheel assemblies coupled with the mounting rail; and
    support structure extending above the mounting rail for supporting components to be assembled.

3. The flexible conveyance system of claim 2, wherein:
    each feed-forward track segment comprises first and second opposed sidewalls defining the channel; and
    the wheel assemblies of the at least one carrier engage the first and second sidewalls of the feed-forward track segments to support the carrier for rolling movement along the feed-forward track segments.

4. The flexible conveyance system of claim 1, further comprising:
    a plurality of return track segments aligned end-to-end and spaced from the plurality of feed-forward track segments;
    each return track segment having an open upper side defining an upwardly-facing channel extending lengthwise along the feed-forward track segment, and having at least one linear motor disposed within the channel; and
    at least one carrier supported for movement along the plurality of return track segments, each carrier including at least one magnet cooperating with the linear motors of the return track segments to move the carrier along the respective return track segments.

5. The flexible conveyance system of claim 1, further comprising:
    at least one pair of vertical translation towers supporting one of the plurality of feed-forward track segments;
    the vertical translation towers adjustable between a first configuration wherein the supported feed-forward track segment is longitudinally aligned with adjacent feed-forward track segments, and a second configuration wherein the supported feed-forward track segment is lowered relative to the adjacent feed-forward track segments.

6. The flexible conveyance system of claim 5, further comprising:
    at least one tool tray associated with the vertical translation towers;
    the at least one tool tray engagable with a carrier on the supported feed-forward track segment when the vertical translation towers are adjusted to the second configuration and the supported feed-forward track segment is lowered.

7. The flexible conveyance system of claim 6, further comprising:
    a yoke cooperating with the tool tray to align components supported on the carrier with the tool tray when the feed-forward track segment is lowered by the vertical translation towers.

8. The flexible conveyance system of claim 1, further comprising:
    at least one robot adjacent at least one feed-forward track segment, the at least one robot adapted to perform at least one of:
    placing parts on a carrier received in the channel of the adjacent feed-forward track segment, or
    performing work on a part supported on a carrier received in the channel of the adjacent feed-forward track segment.

9. A method of assembling components using a conveyance system that includes a plurality of feed-forward track segments and at least one carrier adapted to be conveyed along the plurality of feed-forward track segments, the method comprising:
    supporting the at least one carrier on one of the plurality of feed-forward track segments;
    actuating at least one linear motor to move the carrier along the feed-forward track segments;
    stopping movement of the carrier at a selected station using the at least one linear motor; and
    performing at least one assembly operation using a robotic manipulator.

10. The method of claim 9, wherein the at least one assembly operation comprises at least one of placing a component on the carrier, removing a component from the carrier, or joining at least two components together.

11. The method of claim 9, further comprising
    removing an empty carrier from one of the plurality of feed-forward track segments;
    placing the removed carrier onto a return line comprising a plurality of return track segments; and actuating at least one linear motor to move the carrier along the return track segments in a direction toward a starting point of the plurality of feed-forward track segments.

\* \* \* \* \*